(12) United States Patent
Smith et al.

(10) Patent No.: US 7,730,258 B1
(45) Date of Patent: Jun. 1, 2010

(54) SYSTEM AND METHOD FOR MANAGING HARD AND SOFT LOCK STATE INFORMATION IN A DISTRIBUTED STORAGE SYSTEM ENVIRONMENT

(75) Inventors: Toby Smith, Pittsburgh, PA (US); Richard P. Jernigan, IV, Ambridge, PA (US); Robert Wyckoff Hyer, Jr., Mars, PA (US); Michael Kazar, Pittsburgh, PA (US); David B. Noveck, Lexington, MA (US); Peter Griess, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 293 days.

(21) Appl. No.: 11/591,738

(22) Filed: Nov. 2, 2006

Related U.S. Application Data

(63) Continuation-in-part of application No. 11/264,831, filed on Nov. 1, 2005, now Pat. No. 7,587,558.

(51) Int. Cl.
*G06F 12/00* (2006.01)
(52) U.S. Cl. .......................................... 711/114; 714/6
(58) Field of Classification Search ................. 711/114; 707/8; 714/6
See application file for complete search history.

(56) References Cited

U.S. PATENT DOCUMENTS 5,619,691 A * 4/1997 Katada et al. ............... 707/204
5,819,292 A 10/1998 Hitz et al.
6,032,216 A * 2/2000 Schmuck et al. ............ 710/200
6,219,751 B1 4/2001 Hodges et al.
6,502,166 B1 12/2002 Cassidy
6,556,998 B1 4/2003 Mukherjee et al.
6,564,252 B1 5/2003 Hickman et al.

(Continued)

FOREIGN PATENT DOCUMENTS

JP 10003440 6/1998

(Continued)

OTHER PUBLICATIONS

Brinkmann, A., et al., "Efficient, Distributed Data Placement Strategies for Storage Area Networks" XP-002404501, 10 pages.

(Continued)

*Primary Examiner*—Christian P Chace
*Assistant Examiner*—Hashem Farrokh
(74) *Attorney, Agent, or Firm*—Cesari and McKenna, LLP

(57) ABSTRACT

A system and method manages lock state information in a storage system. A meta-data volume node includes a lock state database which is a comprehensive source for lock state information about data containers in the system. A plurality of data volume nodes include local lock caches, which contain information about locks. Lock state messaging between the meta-data volume node and the data volume nodes is used to assign locks and to update local lock caches. The meta-data volume node is configured to determine whether input/output requests should be allowed or denied and to instruct the data volume nodes of this input/output operation result. Lock information is also sent to the data volume nodes for storage in local lock state caches to the extent the data volume nodes have the network capacity locally.

24 Claims, 18 Drawing Sheets

U.S. PATENT DOCUMENTS

| | | | |
|---|---|---|---|
| 6,671,773 | B2 | 12/2003 | Kazar et al. |
| 6,970,872 | B1 * | 11/2005 | Chandrasekaran et al. .... 707/10 |
| 7,159,093 | B2 | 1/2007 | Dalal et al. |
| 7,185,144 | B2 | 2/2007 | Corbett et al. |
| 7,302,520 | B2 | 11/2007 | Kazar et al. |
| 7,352,612 | B2 * | 4/2008 | Hamberg et al. ............ 365/158 |
| 7,409,494 | B2 | 8/2008 | Edwards et al. |
| 7,587,558 | B1 | 9/2009 | Smith et al. |
| 2003/0188045 | A1 | 10/2003 | Jacobson |
| 2003/0221124 | A1 * | 11/2003 | Curran et al. ............... 713/201 |
| 2004/0133652 | A1 | 7/2004 | Miloushev et al. |
| 2004/0139167 | A1 | 7/2004 | Edsall et al. |
| 2005/0015384 | A1 * | 1/2005 | Wehrman et al. ........... 707/100 |
| 2005/0192932 | A1 | 9/2005 | Kazar et al. |
| 2006/0184731 | A1 | 8/2006 | Corbett et al. |
| 2006/0248088 | A1 | 11/2006 | Kazar et al. |

FOREIGN PATENT DOCUMENTS

| | | |
|---|---|---|
| WO | WO 00/07101 | 2/2000 |

OTHER PUBLICATIONS

Ganger, Gregory R., et al., "Disk Subsystem Load Balancing: Disk Striping vs. Conventional Data Placement" Department of Electrical Engineering and Computer Science, University of Michigan, Ann Arbor, 10 pages.

Hartman, J. H., et al., "Zebra: A Striped Network File System" Proceedings of the Usenix File Systems Workshop, Apr. 1998 pp. 1-9, XP002926950.

Hartman, J. H., et al., "The Zebra Striped Network File System" Dec. 1, 1993, Operating Systems Review, ACM, New York, NY, US, pp. 29-43, XP000418681, Issn: 0163-5908.

Network Appliance, Inc., Notification of Transmittal of the International Search Report and the Written Opinion of the International Searching Authority, or the Declaration, International Application No. PCT/US2005/030889, International Filing Date: Aug. 31, 2005, Date of Mailing of Document: Jan. 13, 2006, 7 pages.

Network Appliance, Inc., Notification of Transmittal of the International Search Report and the Written Opinion of the International Searching Authority, or the Declaration, International Application No. PCT/US2006/016055, International Filing Date: Apr. 27, 2006, Date of Mailing of Document: Nov. 9, 2006, 10 pages.

Ho, T. K., et al., "A Row Permutated Data Reorganization Algorithm for Growing Server-Less Video-On-Demand Systems", Department of Information Engineering. The Chinese University of Hong Kong, Shatin, N.T., Hong Kong, May 12, 2003, 8 pages.

Honicky, R. J., et al., "A Fast Algorithm for Online Placement and Reorganization of Replicated Data", Storage Systems Research Center, University of California. Santa Cruz, Apr. 22, 2003, 10 pages.

Simitci, H., et al., "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.

Shinkai, E., et al., "HAMFS File System" Reliable distributed systems, 1999. Proceedings of the 18th IEEE Symposium on Lausanne, Switzerland, Oct. 19-22, 1999, Los Alamitos, CA, USA, IEEE Comput, Soc., US, Oct. 19, 1999, pp. 190-201, XP010356993.

\* cited by examiner

| CF PROTOCOL | 410 |
|---|---|
| RC | 408 |
| UDP | 406 |
| IP | 404 |
| MEDIA ACCESS | 402 |

| SVS ID 502 | INODE NUMBER 504 | UNIQUE-IFIER 506 | STRIPED FLAG 508 | STRIPING EPOCH NUMBER 510 |
|---|---|---|---|---|

SYSTEM AND METHOD FOR MANAGING HARD AND SOFT LOCK STATE INFORMATION IN A DISTRIBUTED STORAGE SYSTEM ENVIRONMENT

CROSS REFERENCE TO RELATED APPLICATION

This application is a continuation in part application based on U.S. patent application Ser. No. 11/264,831, now U.S. Pat. No. 7,587,558, Smith et al. for a SYSTEM AND METHOD FOR MANAGING HARD LOCK STATE INFORMATION IN A DISTRIBUTED STORAGE SYSTEM ENVIRONMENT, which was filed on Nov. 1, 2005, and issued on Sep. 8, 2009, the contents of which are presently incorporated by reference herein in entirety.

FIELD OF THE INVENTION

The present invention relates to a distributed cluster computer environment and, more particularly, to managing hard and soft lock state information in memory-constrained components in such environments.

BACKGROUND INFORMATION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular to storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that, data container may exceed its processing resources and become overburdened, with a concomitant degradation of speed and performance.

One technique for overcoming the disadvantages of having a single data container that is heavily utilized is to stripe the data container across a plurality of volumes configured as a striped volume set (SVS), where each volume is serviced by a different storage system, thereby distributing the load for the single data container among a plurality of storage systems. A technique for data container striping is described in the above-incorporated U.S. patent application Ser. No. 11/119,278 of Kazar et al., entitled STORAGE SYSTEM ARCHITECTURE FOR STRIPING DATA CONTAINER CONTENT ACROSS VOLUMES OF A CLUSTER. In such an environment, a SVS comprises one or more data volumes (DV) and a meta-data volume (MDV). Each DV and the MDV is typically served by a separate node of the distributed storage system environment. In the environment described in the above-incorporated U.S. Patent Application, the node may comprise a network element (N-module) and a disk element (D-module) that includes a file system. As used herein a D-module serving (hosting) a DV is referred to as a "DV node," while a D-module hosting the MDV for a SVS is referred to as a "MDV node."

Most file access protocols include locking capabilities. A lock is a mechanism that enables a client or system administrator to prevent access to a shared resource. An entity later attempting to access this shared resource will be notified of the lock, which may prevent others from accessing the resource. The types of locks can vary. For example, in some instances, there may be a write lock placed on a resource by the owner, yet other entities may be able to simultaneously obtain read access to the resource. The type of lock, and/or the absence of a lock over a particular data container, such as a file, or to portion thereof are referred to herein as a "lock state."

Various challenges arise with respect to managing lock state information regarding a distributed storage system. The volume of lock state information can be potentially large and subject to constant change as information is updated and edited.

Known techniques for managing lock state information include an approach in which lock state information is distributed directly to end clients. In this case, clients and/or end users utilize specific lock state management software applications and special protocols that allow the users to create, edit and manage lock state information.

Another approach stores lock state information in a central repository for the entire system; however, this centralized approach can result in a bottleneck for file access in a large, distributed system.

The approach described in the previously incorporated parent application Ser. No. 11/264,831 discloses a method and system in which a lock state manager configures a MDV as the authoritative source for lock state information for data containers on the SVS. Client requests for access to a particular data container or a portion of a container are directed to the MDV node, which searches its lock state database and returns the resulting lock state information to respective DV nodes associated with the data containers that store the requested data. The lock state information for each data request is returned by the MDV node to the DV node for storage in a local lock cache on the DV node.

Many DV nodes, however, have limited memory resources, thus limited space. In such limited memory situations, the DV node does not have adequate memory space capacity to store all lock state information provided to it by the MDV node. Secondly, the DV node may be unable to render a decision about whether to process a read or write request, e.g., directed to a file, because it may not have all of the respective lock state information for that file. In other words, if the DV node has consumed all of its memory capacity prior to receiving all of the lock state information, then it cannot retain all of the information locally and thus, may be unable to make a processing decision. Moreover, the DV node may not even be capable of returning a response to the MDV node, which to may cause the system to hang up or other similar error condition.

The parent application further discloses the use of permissive areas, which are similar to locks that are pre-assigned to designate one or more areas in a file that contain no locks. Permissive area information is sent to a DV node upon a request to the MDV node for lock state information about a file range that includes a respective permissive area. However, the request for permissive area information also requires additional memory capacity on the part of the DV nodes in order to locally store and maintain the information at the node.

Thus, there remains a need for a system that provides lock state information between an MDV node and its associated DV nodes, which requires only limited memory resource space, i.e., a small memory footprint, particularly in a local lock cache of the node. In addition, there remains a need for a technique for controlling lock state information while maintaining the ability to rapidly update this information on the distributed storage system without requiring the use of specialized software programs, and without requiring large memory resource capacity on each DV node.

SUMMARY OF THE INVENTION

The present invention overcomes the disadvantages of the prior art by providing a technique for managing lock state information in a distributed storage system architecture comprising two or more volumes distributed across a plurality of nodes interconnected as a cluster. The volumes are organized as one or more striped volume sets (SVS) and configured to store content of data containers, such as files and logical units, served by the cluster in response to multi-protocol data access requests issued by clients. Each node of the cluster includes (i) a storage server adapted to service a volume of a SVS and (ii) a multi-protocol engine adapted to redirect the data access requests to any storage server of the cluster. Notably, the content of each data container is apportioned among the volumes of the SVS to thereby improve the efficiency of storage service provided by the cluster.

According to the invention, a lock manager is configured to efficiently manage to the lock state information, including granting, revoking and releasing of various types of locks on data containers or ranges of data containers stored on the SVS. Illustratively, the lock manager functions, inter alia, to manage lock state information including hard, soft, shared and exclusive lock state information. As used herein, "hard locks" are client requested locks which prevent other clients from either obtaining a conflicting lock or from violating the hard lock. For example, if client A obtains a hard lock to prevent I/O operations over a particular region of a file; then later client B will not only be unable to obtain a conflicting lock as to that region, but also will be unable to simply issue an I/O request against that region, even if client B does not attempt to obtain a lock first. Hard locks are also sometimes referred to by those skilled in the art as "mandatory locks."

These are in contrast to soft locks, which in contrast, provide no such guarantee. The soft lock prevents clients from obtaining a conflicting lock. For example, if client A obtains a soft lock to prevent I/O requests over a particular region of a file, then client B could successfully perform I/O operations over that region (though this would not be desirable) as long as client B does not attempt to obtain a conflicting lock.

As used herein, "shared locks" are locks which span an entire file, as opposed to a "range" lock, which describes a range of a file. Shared locks and range locks can be either read or write locks. Write locks are sometimes referred to as "exclusive" locks, i.e., locks that allow only one writer at a time. A write lock may or may not allow concurrent read transactions during a write transaction by the client holding the exclusive lock. This protects against concurrent data changes. Read locks allow concurrent read transactions.

In accordance with the distributed storage system architecture, each SVS comprises a meta-data volume (MDV) configured to store a canonical copy of meta-data, including access control lists and directories, associated with all data containers stored on the SVS, and one or more data volumes (DV) configured to store, at least, data content of those containers. Notably, the MDV (the "MDV node") also functions as the authoritative source for lock state information for data containers on the SVS. To that end, the lock manager configures and maintains a lock state database on the MDV that contains to the lock state information for the SVS. Client requests for access to particular data containers or portions of data containers are directed to and processed by the MDV node and the resulting lock state information is provided to the DVs ("DV nodes") for storage on local lock caches on the DV nodes.

In accordance with a further aspect of the invention, novel lock state command messages are provided to convey lock state information between the MDV node and the DV nodes. For example, in response to receiving a data access request directed to a data container from a client, the DV node checks its own local lock cache to determine whether it contains relevant lock state information for the pending request. If not, the DV node sends a command/query within a lock state message to the MDV node, which responds with appropriate lock state information regarding conflicting locks, if any.

When a DV node sends a lock state message to the MDV node with a command/query, the MDV node inspects the lock state information with respect to a range (if any) requested by the DV node and determines whether there are shared locks or exclusive locks pertaining to that requested range. The MDV node then consults this relevant lock state information and determines whether the data access request is permitted, depending on the type of locks present and whether the request is a read request or a write request. For example, if the request is a write request for a range upon which there is an exclusive lock in effect, then that write request must be denied.

After determining that the DV node's request will be accepted or rejected based on its local lock state information, the MDV node constructs a response to the DV node. The response contains the specific locks pertaining to the DV node's request, along with a field which states whether the file operation is permitted to proceed or not. The DV node will add the lock state returned in the MDV node's response in its local lock cache, assuming it has sufficient memory space available. However, if the DV node does not have the requisite memory space available in its local lock cache, then it can still process the request or deny the request accordingly based upon the authoritative operation permission result provided to it in the MDV node's response. By providing both the relevant lock state as well as an authoritative decision about the acceptability of the requested operation, the system is able to behave properly even in cases where the DV node is unable (or unwilling) to store more lock state information in its local cache.

In addition, illustratively, the MDV node maintains a record of lock state information that it has sent to each DV node. Subsequently if a client removes a lock from a file, the MDV node examines the lock being removed and notifies each affected DV node that this lock is no longer present.

BRIEF DESCRIPTION OF THE DRAWINGS

The above and further advantages of the present invention may be better understood by referring to the following description in conjunction with the accompanying drawings, in which like reference numerals indicate identical or functionally similar elements:

FIG. 4 is a schematic block diagram illustrating the format of a cluster fabric (CF) message in accordance with an illustrative embodiment of the present invention;

FIG. 5 is a schematic block diagram illustrating the format of a data container handle in accordance with an illustrative embodiment of the present invention;

DETAILED DESCRIPTION OF AN ILLUSTRATIVE EMBODIMENT

Figure 1:
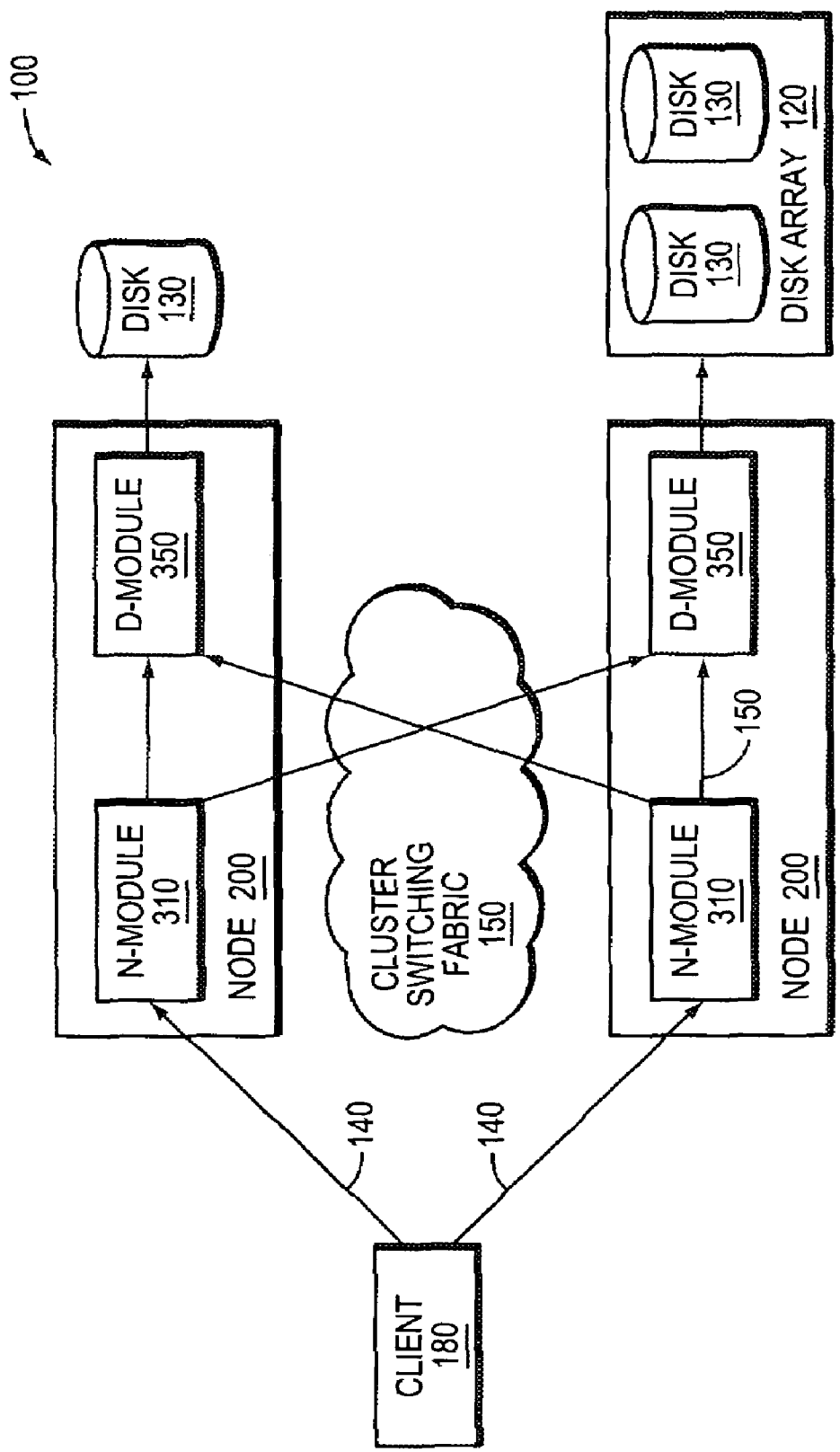
FIG. 1 is a schematic block diagram of a plurality of nodes interconnected as a cluster in accordance with an illustrative embodiment of the present invention.

A. Cluster Environment to FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only. In an alternate embodiment, each N or D-module in the distributed storage system environment may be referred to as a node of such environment.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP/IP (iSCSI) and SCSI encapsulated over Fibre Channel (FCP), when accessing information in the form of blocks.

B. Storage System Node

Figure 2:
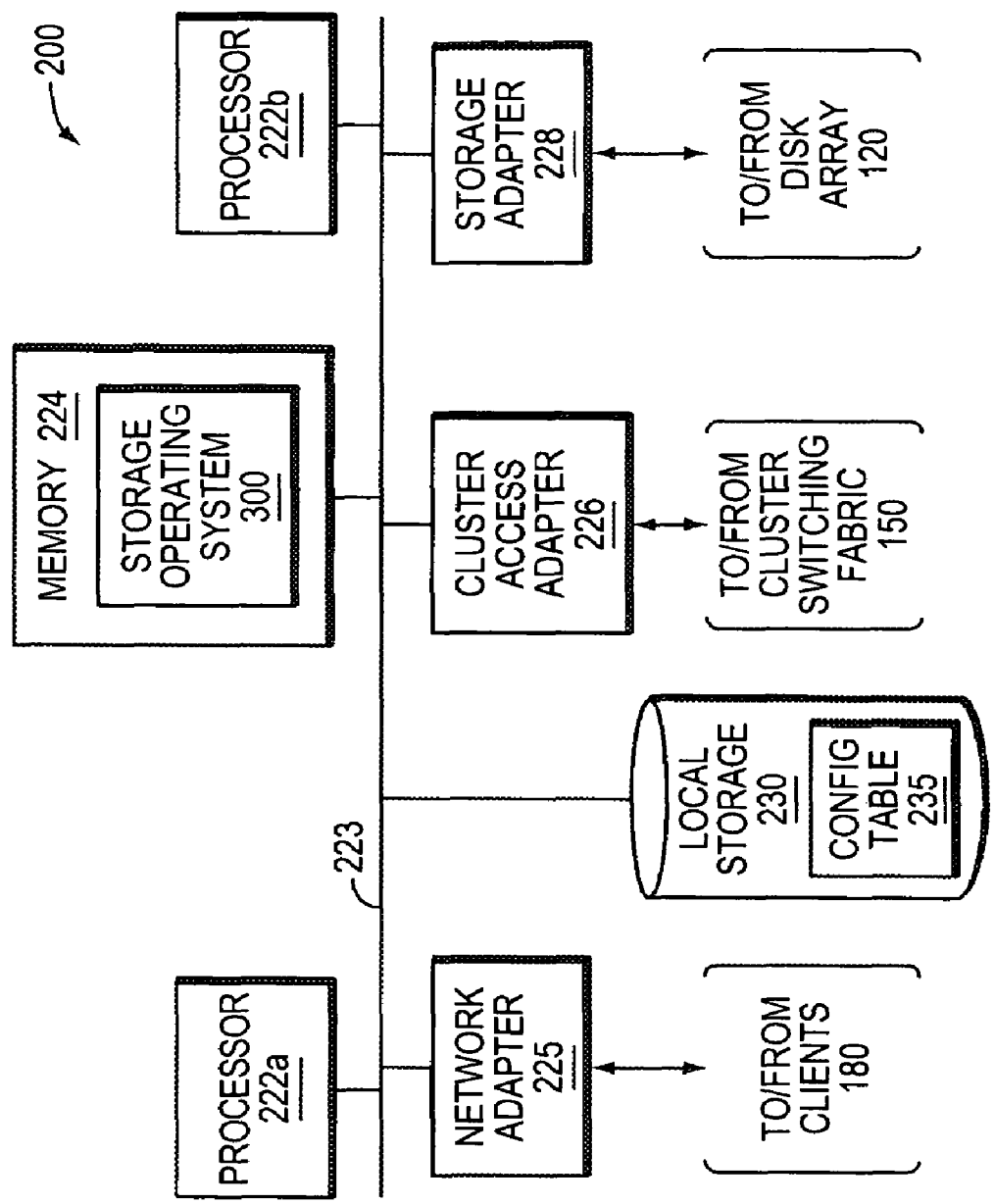
FIG. 2 is a schematic block diagram of a node in accordance with an illustrative embodiment of the present invention.

FIG. 2 is a schematic block diagram of an exemplary node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging disframes or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP® operating system available from Network Appliance, Inc., of Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
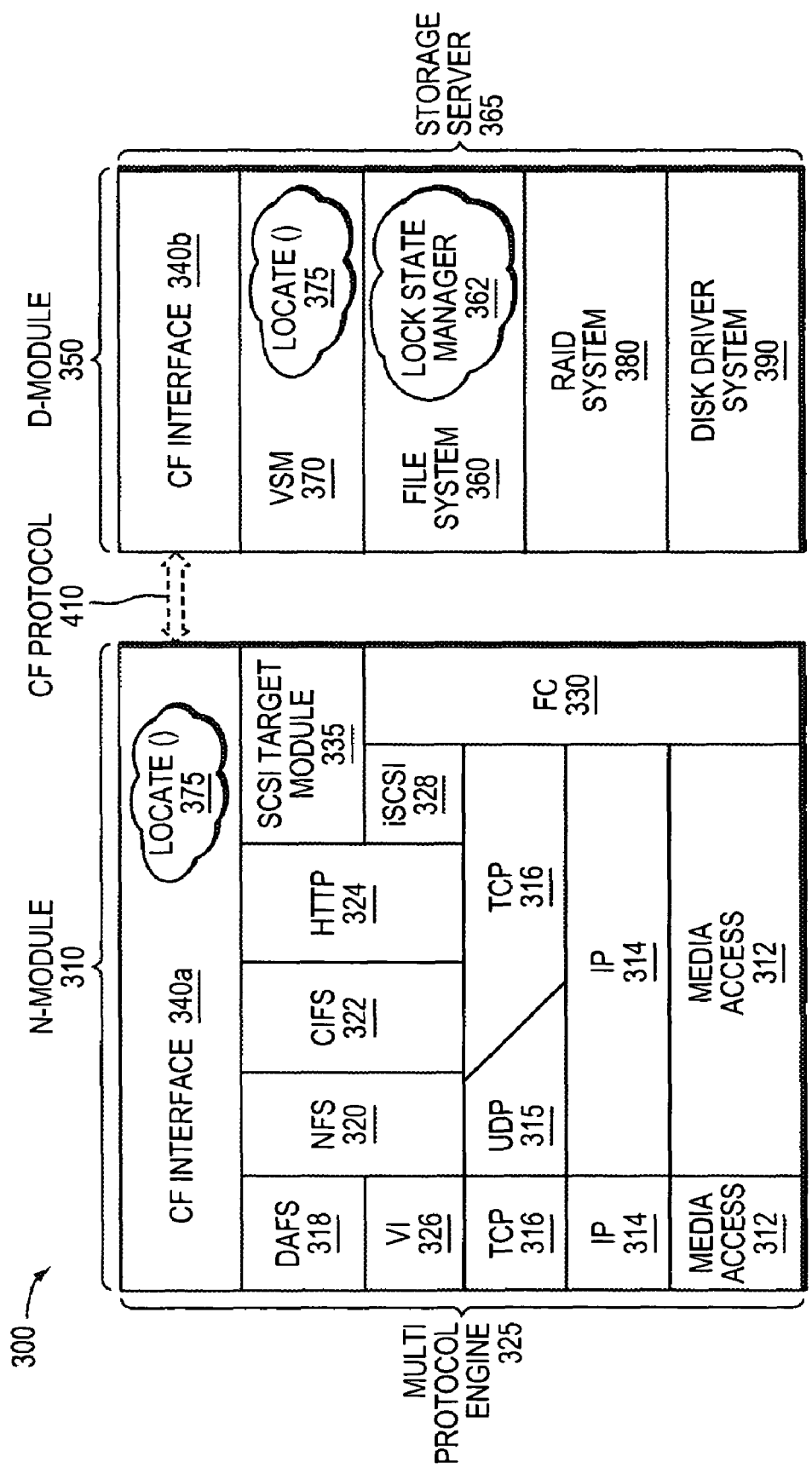
FIG. 3 is a schematic block diagram of a storage operating system that may be advantageously employed with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSIspecific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS). As described further herein, the VSM cooperates with the to file system 360 to enable storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL® file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an Mode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

As described further herein, the file system includes a lock state manager 362, which is a software process that is configured to efficiently manage lock state information including granting, revoking and releasing of various types of locks on data containers, such as files, stored on the SVS. For example, in response to a file access operation that includes a request for a lock of a particular type, the lock manager 362 decides whether to grant, refuse to grant, or wait for the appropriate time to grant that lock. To that end, the lock manager 362 coordinates shared/open requests, which provide for locks on an entire file, and range locks that cover a specific byte range within a file. As will be understood by those skilled of the art, both shared locks and range locks can be read locks that allow concurrent transactions so that more than one client can read a file concurrently. Alternatively, the shared lock or range lock may be a write lock which protects against concurrent data changes. As noted herein, sometimes a write lock is referred to as an "exclusive" lock, which may not allow concurrent access, or allows read only concurrent access. Both shared/open locks and range locks are established upon request of the client, who then becomes the owner of the lock. Illustratively, the locks may be removed only by the lock owner. More specifically, the lock manager 362 functions, inter alia, to manage lock state information including hard lock state information. As noted herein, "hard locks" are client requested locks that prevent other clients from either obtaining a conflicting lock or from violating the hard lock. For example, if client A obtains a hard lock to prevent I/O operations over a particular region of a file, then later client B will not only be unable to obtain a conflicting lock as to that region, but also will be unable to simply issue an I/O request against that region, even if client B does not attempt to obtain a lock first.

These are in contrast to soft locks, which in contrast, provide no such guarantee. The soft lock prevents clients from obtaining a conflicting lock. For example, if client A obtains a soft lock to prevent I/O requests over a particular region of a file, then client B could successfully perform I/O operations over that region (though this would not be desirable) as long as client B does not attempt to obtain a conflicting lock.

Operationally, a data access request directed to a data container, such as a file, is issued from a client 180 and forwarded as a packet over the computer network 140 to the node 200, where it is received at the network adapter 225. A network driver (of layer 312 or layer 330) processes the packet and, if appropriate, passes it on to a network protocol and file access layer for additional processing prior to forwarding to the write-anywhere file system 360. The lock state manager 362 examines the lock state information to determine whether there is an existing lock on the file that could prevent execution of the operation associated with the access request.

If it is determined that execution of the operation is allowed, the file system generates additional operations to load (retrieve) the requested data from disk 130 if it is not resident "in core", i.e., in memory 224 (FIG. 2). If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases to the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340 a,b adapted to implement intra-cluster communication among the modules, as well as D-module-toD-module communications, for data container striping operations, for example.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the N-module and D-module although, in the case of remote communication between an N-module and D-module of different nodes, such message passing occurs over the cluster switching fabric 150. A known message-passing mechanism provided by the storage operating system to transfer information between N-modules and D-modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system command messages, including novel lock state command messages described herein, among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 deencapsulates the CF message and processes the file system command.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands, including the lock state commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers. Further details about an illustrative file system organization can be found in commonly-owned U.S. patent application Ser. No. 11/119,278, filed on Apr. 29, 2005, of Kazar, et al., for a STORAGE SYSTEM ARCHITECTURE FOR STRIPING DATA CONTAINER CONTENT ACROSS VOLUMES OF A CLUSTER, which is incorporated by reference herein in its entirety.

E. Storage System Architecture

The present invention is directed to a technique for managing lock state information in a distributed storage system architecture comprising two or more volumes distributed across a plurality of nodes 200 of cluster 100. As noted, the volumes are organized as one or more striped volume sets (SVS) and configured to store content of data containers, such as files and luns, served by the cluster in response to multiprotocol data access requests issued by clients. Each node may include a D-module adapted to service a volume of the SVS. As more particularly illustrated in FIG. 6, the SVS comprises a meta-data volume (MDV) 602 and one or more data volumes (DV), DV1 604 and DV2 606. The MDV 602 is configured to store a canonical, or definitive, copy of certain meta-data, including access control lists (ACLs) and directories, associated with all data containers, e.g., files, stored on the SVS, whereas each DV is configured to store, at least, data contents of those files. The MDV and the DV cooperate (with a container attributes volume, CAV) to provide a multi-tier caching and distribution architecture described in commonly owned U.S. patent application Ser. No. 11/119,277, filed on Apr. 29, 2005, of Kazar et al., entitled SYSTEM AND METHOD FOR MULTI-TIERED METADATA CACHING AND DISTRIBUTION IN A CLUSTERED ENVIRONMENT, which is incorporated herein by reference in its entirety. As used herein, a D-module 350 serving (hosting) a DV is referred to herein as a "DV node" while a D-module hosting the MDV in a SVS is referred to as an "MDV node."

Figure 6:
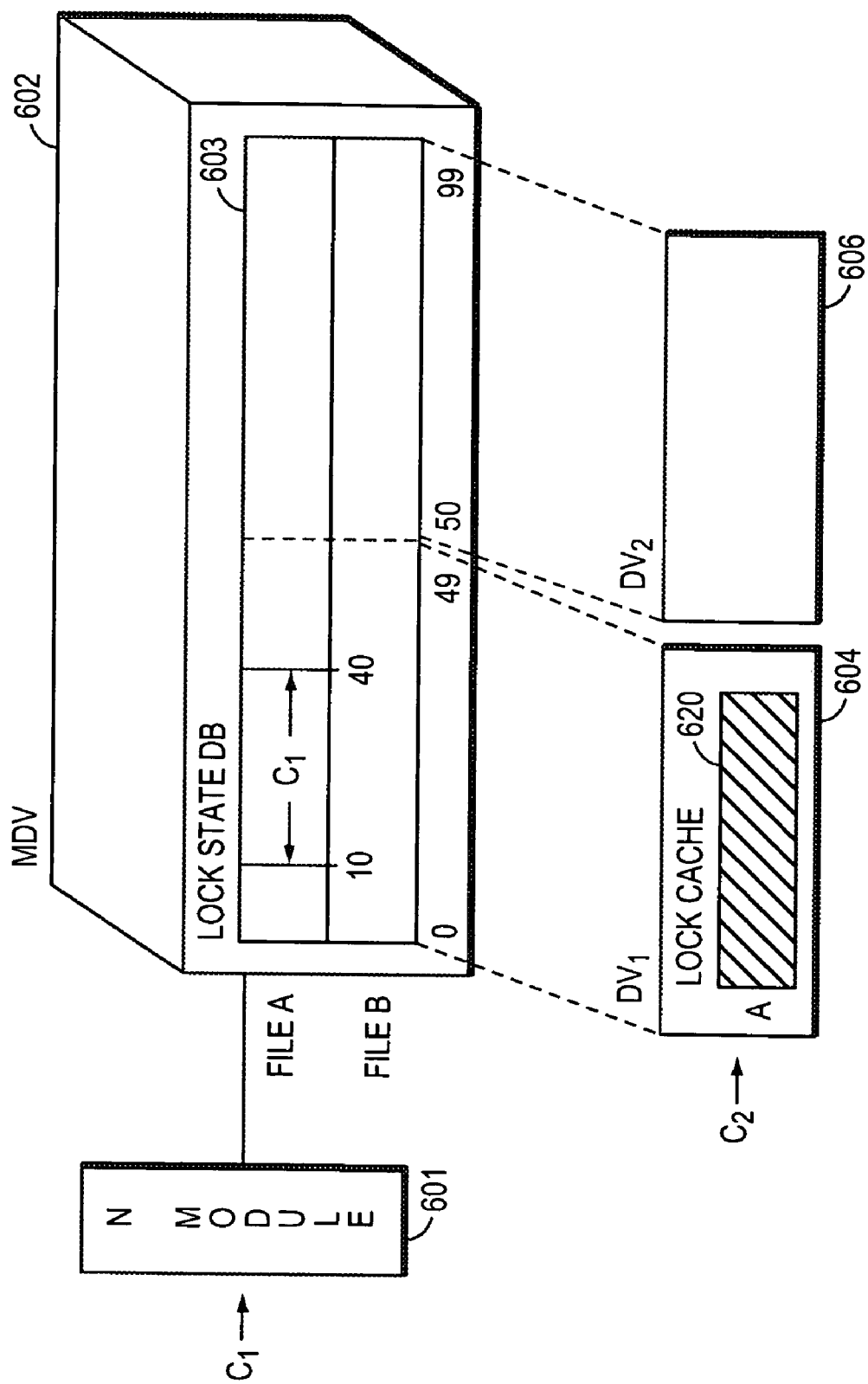
FIG. 6 is a schematic block diagram of a metadata volume (MDV) node and its associated lock state database and the respective data volume (DV) nodes in accordance with an illustrative embodiment of the present invention.

FIG. 6 is a schematic block diagram illustrating an MDV node 602 and its associated lock state information cached by one or more DV nodes 604, 606 in accordance with an illustrative embodiment of the present invention. In accordance with the invention, the MDV node 602 functions as the authoritative source for all lock state information for all data containers stored on the SVS. To that end, the lock manager 362 configures and maintains a lock state database (DB) 603 on the MDV node 602 that stores the lock state information for all files in the SVS. Moreover, each DV node has its own local lock cache 620 for storing information it may have about locks on the volumes that it serves.

However, the local lock cache 620 has a limited memory space capacity. Therefore, only a limited amount of information may be stored by the DV node 604. Accordingly, a suitable caching methodology is employed to determine the information that is to be cached. Illustratively, one way of selecting information that is to be cached in a memory constrained environment is to establish packing rules, which list various types of information in order of priority such that the types of information are stored in that order until the limited memory space of the local lock cache reaches its capacity. The following illustrative packing rules may be applied in this illustrative order, or in a different order, and some of the following rules may be included in the rule set or not, depending upon the particular application of the invention. It is noted that if a rule fails, the next rule is attempted, and thus the rules may illustratively be: a) attempt to include all uncached sharelocks for the file; b) attempt to include all uncached range locks for the file; c) attempt to include all uncached range locks for the file stripe in which the I/O operation resides; d) attempt to include all uncached range locks for the range of the requested I/O operation; and e) include as many uncached range locks as possible beginning a the starting location of the requested I/O operation. The older data can be discarded on a FIFO basis, or other suitable methodology.

Further, in accordance with the invention, the MDV node is configured to perform the lock state calculations regarding whether a particular I/O operation can be allowed or denied at the DV. More specifically, as illustrated in FIG. 6, File A and File B span two stripes exactly once in each DV node 604 and 606 such that DV1 node 604 serves/hosts the first 50 bytes (offset 1-49) for each file, and DV2 node 606 hosts the next 50 bytes (offset 50-99) for each file. The lock state database 603 in the MDV node 602 maintains all of the lock state information for the ranges embodied in Files A and B from offset 0 to offset 99.

Figure 7:
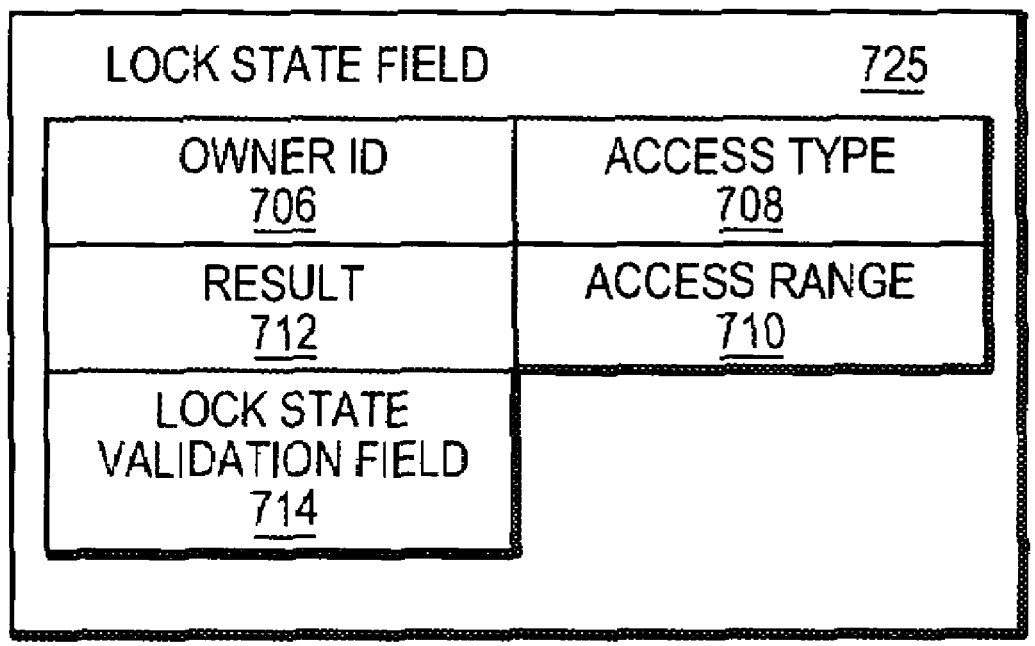
FIG. 7 illustrates one embodiment of a lock state data structure in accordance with an illustrative embodiment of the present invention.

The specific lock state information that is maintained for each file is schematically illustrated in the lock state information data structure of FIG. 7. The lock state information data structure 700 contains a lock state field 725 that, in turn, includes an owner identification (ID) field 706 that stores an owner ID or a unique identifier of the client that is allowed to access the file. An access type field 708 stores an indication of the type of lock, which illustratively is either a read lock or a write lock. In addition, an access range field 710 is provided that indicates the range of the file locked by the lock type. Result field 712 indicates whether or not the request should be allowed or denied by the DV node. In accordance with the invention, the MDV node calculates whether or not the request should be allowed or denied and inserts this information into lock information data structure result field 712. The lock state validation field 714 allows the MDV node to notify the DV node about whether it has all the lock state information for that entire file.

Illustratively, if the field 714 is true, then the DV node has thereby been notified that it does in fact now have all the lock state information for the file in question. This means that DV node does not have to call up to the MDV node regarding lock state for any subsequent I/O requests involving that particular file. If field 714 is illustratively, false, then this indicates to the DV node that it does not have all of the lock state information and thus it must call up to the MDV node to obtain additional information for further I/O requests.

Referring again to FIG. 6, assume further that a client C1 sends a request to the N-module 601 to obtain exclusive write access for ranges 10-40 of File A stored on the SVS. The N-module 601 directs this request to the MDV node as the authoritative source of lock state information for that SVS. The MDV node places an exclusive lock on bytes 10-40 of the File A for C1 in its lock state database 603. Assume now, that a client C2 subsequently requests write access to byte 25 of File A. Specifically, the DV node 604 receives an I/O request from a client C2 for write access to byte 25 of file A for example. In turn, the DV node 604 searches its local lock cache 620 for lock state information pertaining to that file range. If the lock state cache 620 is empty with respect to the file range indicated in the request, then the absence of the information causes the DV node to query the MDV node 602 to determine the current lock state information with respect to the requested byte 25 of File A. When the DV node queries the MDV node, it sends a message to the MDV node 602 and includes the information above the type of I/O request involved. More specifically, the DV node sends a message requesting write access to byte 25 of File A.

In response, the MDV node consults its authoritative lock state database 603 and provides a result about the validity of the I/O request in its response to the DV node by calculating whether a write operation is allowable for that byte range requested. In the present example, byte 25 is subject to an exclusive lock by client C1 and thus a write request is not available for the client C2. Therefore, in accordance with the invention, the MDV node responds with a result that the request should be denied. As there are one or more locks in the requested range, the MDV node also responds with the information about the set of locks that is relevant to that particular request. Illustratively, the MDV node 602 responds to the DV node 604 that a client has a write lock on bytes 10-40. Notably, the MDV node is unable to provide the DV node with full lock state information because the DV node's local lock cache 620 is out of memory space; nevertheless, the MDV node still returns the result about the I/O request. Therefore, requests can continue to be processed even in a memory constrained environment in which the local lock cache 620 of the DV node is out of memory space. Note that communication between the MDV and DV nodes is effected using lock state commands embedded in the CF protocol message 400, e.g., CF protocol field 410, as described previously with respect to FIG. 4.

Figure 8:
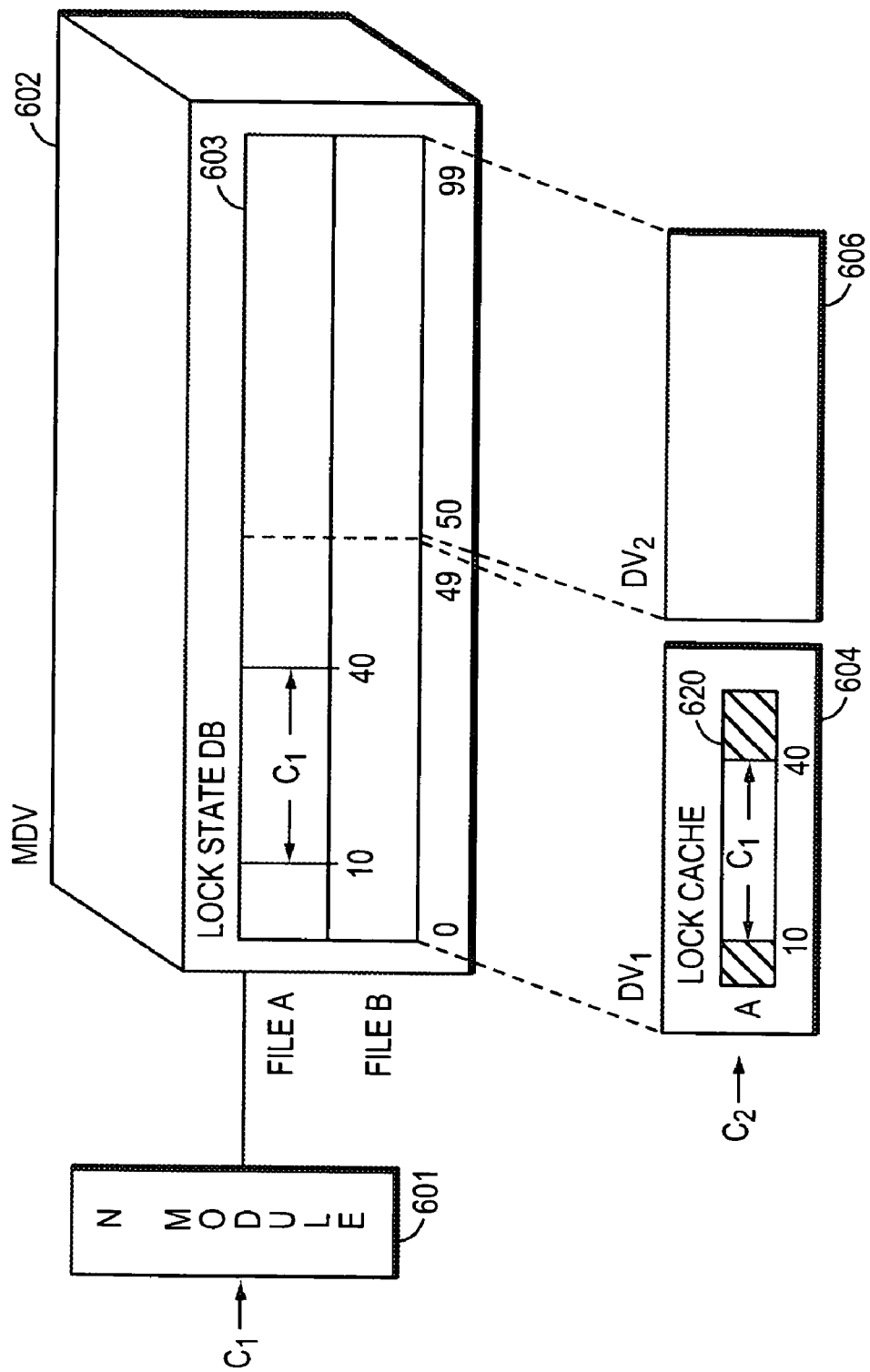
FIG. 8 is schematic block diagram of the system of FIG. 6 illustrating an update of the local lock cache.

FIG. 8 is a schematic block diagram illustrating update of the lock cache 620 of the DV node 604 with the lock state information provided by the MDV node 602. Here, the lock cache 620 of DV 1 604 is updated to indicate that there is a write lock on bytes 10-40 in File A. The DV1 node then notifies the requesting client C2, that the request is denied. Notably, the MDV node also keeps track of which DV nodes have been notified of lock state information. Accordingly, with respect to future requests, the MDV node has a record of lock state information which has already been provided to the DV nodes on an individual basis.

Figure 9A:
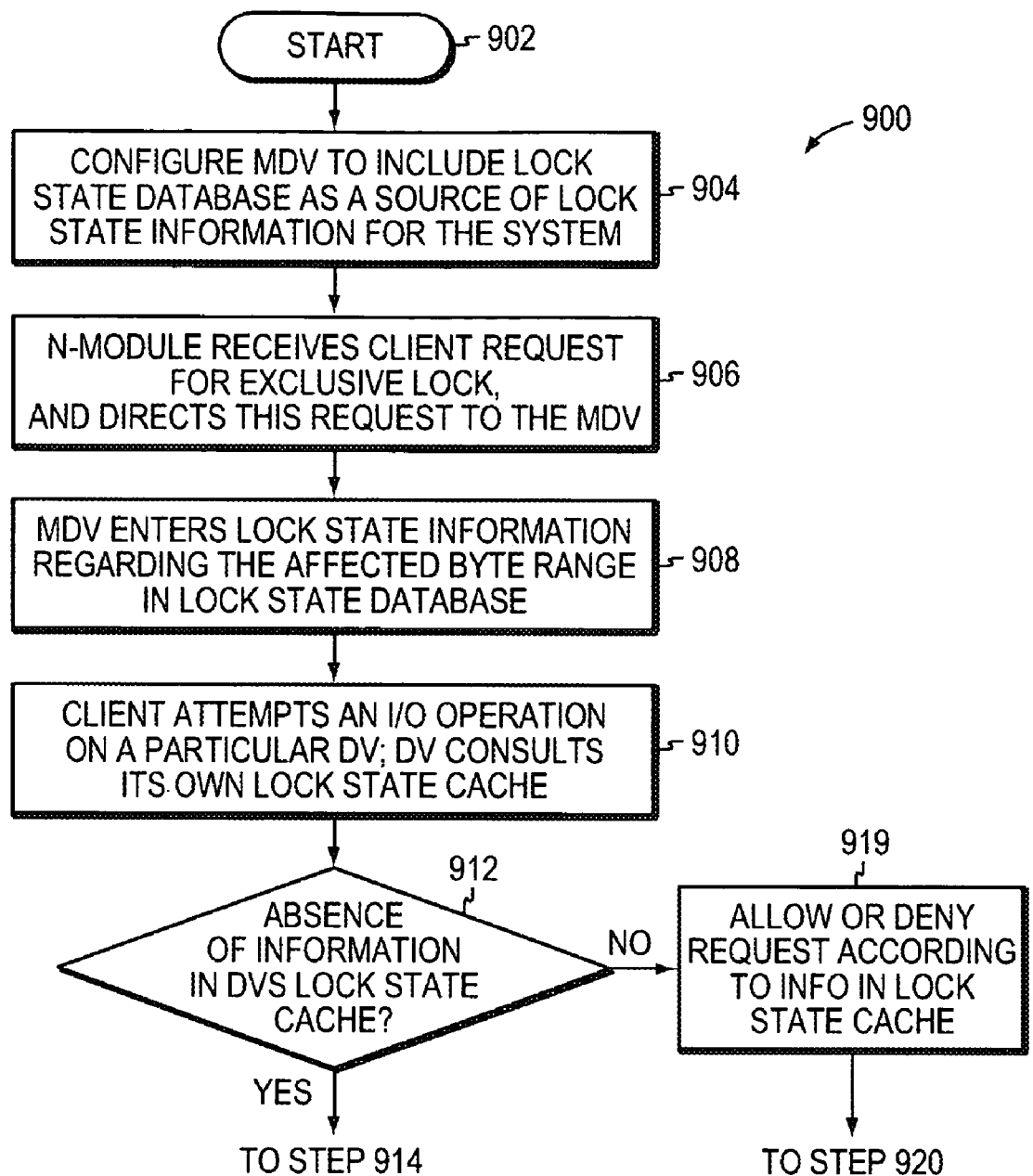
FIGS. 9A and 9B are flow charts of a procedure for managing requested locks and data access requests in accordance with an illustrative embodiment of the invention.
Figure 9B:
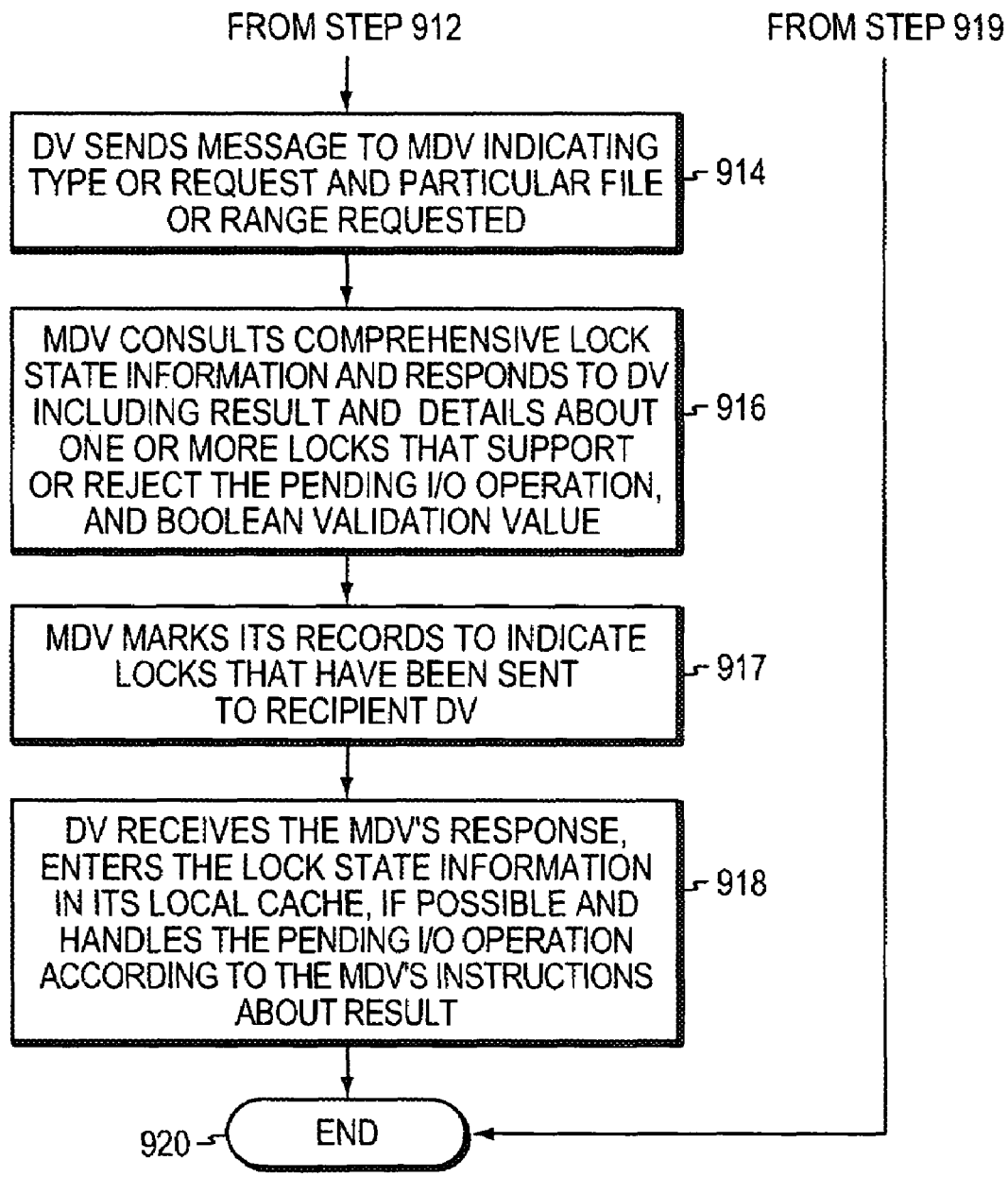

The procedure described above is summarized in the flowchart 900 of FIGS. 9A and 9B. The procedure starts at step 902 and continues to step 904 where a lock state database is established in the MDV node as the source for lock state information for the SVS. In step 906, an N-module receives a request for exclusive access to a range of a file from a client. The N-module directs this request for exclusivity to the MDV node 602. Assuming there is no conflict (i.e., no existing lock to the requested file range); in step 908 the MDV node 602 enters the lock state information for the affected byte range in its to lock state database 603. Subsequently, when a data access request arrives at a particular DV node via the N-module, that DV node checks its local lock cache 620 for information about a lock state that exists for the affected range (step 910). At step 912, a determination is made as to whether the lock cache 620 is empty.

The absence of information in the lock state cache causes the procedure to continue to step 914 whereby the DV node sends a message to the MDV node indicating the type of request and the particular file or byte range requested (step 914). In step 916, the MDV node checks its lock state database and calculates whether or not a read or write request can be performed for the particular file type or range requested depending upon locks which exist for that file or byte range. For example, if a read request has been submitted, certain locks will allow a read request concurrently with another read request. Alternatively, if a write request has been submitted, exclusive locks do not allow any type of concurrent transactions during a write operation. The MDV node checks the type of lock and the type of transaction being requested and makes a determination based on its own lock state database information and returns a result to the DV node. In addition, it responds with relevant lock state information about byte ranges involved in the request.

In step 917, the MDV node marks its records that the requesting DV node has been notified of particular locks. The DV node then updates its local lock cache, if possible, accordingly as shown in step 918. If the local lock cache 620 is at full memory capacity, then the DV node can still respond to the client because it has received the results from the MDV node. If the local lock cache 620 of the affected DV node does contain lock state information at step 912, then the procedure continues to step 919 where the DV node checks its local lock cache information indicating whether the operation is allowed or should be rejected. The client is notified accordingly and thereafter, the procedure ends at step 920.

As noted herein, in addition to responding to the DV node with the result as to whether the request can be allowed or denied and locks that pertain to that particular file or byte range, the MDV node also, in accordance with the invention, sends the DV node a Boolean value, which indicates whether the DV node has all of the relevant lock state information for the particular file in question. Thus, the DV node can update its own records accordingly (if possible, as indicated in step 916 of FIG. 9). As noted, if the DV invalidation value sent to the DV node is indicated as false then the DV node has implicitly been told that it does not have all lock state information for the file in question, and thus upon receiving the next I/O request pertaining to that file the DV node must request ("call up") to the MDV node for additional information.

Figure 10:
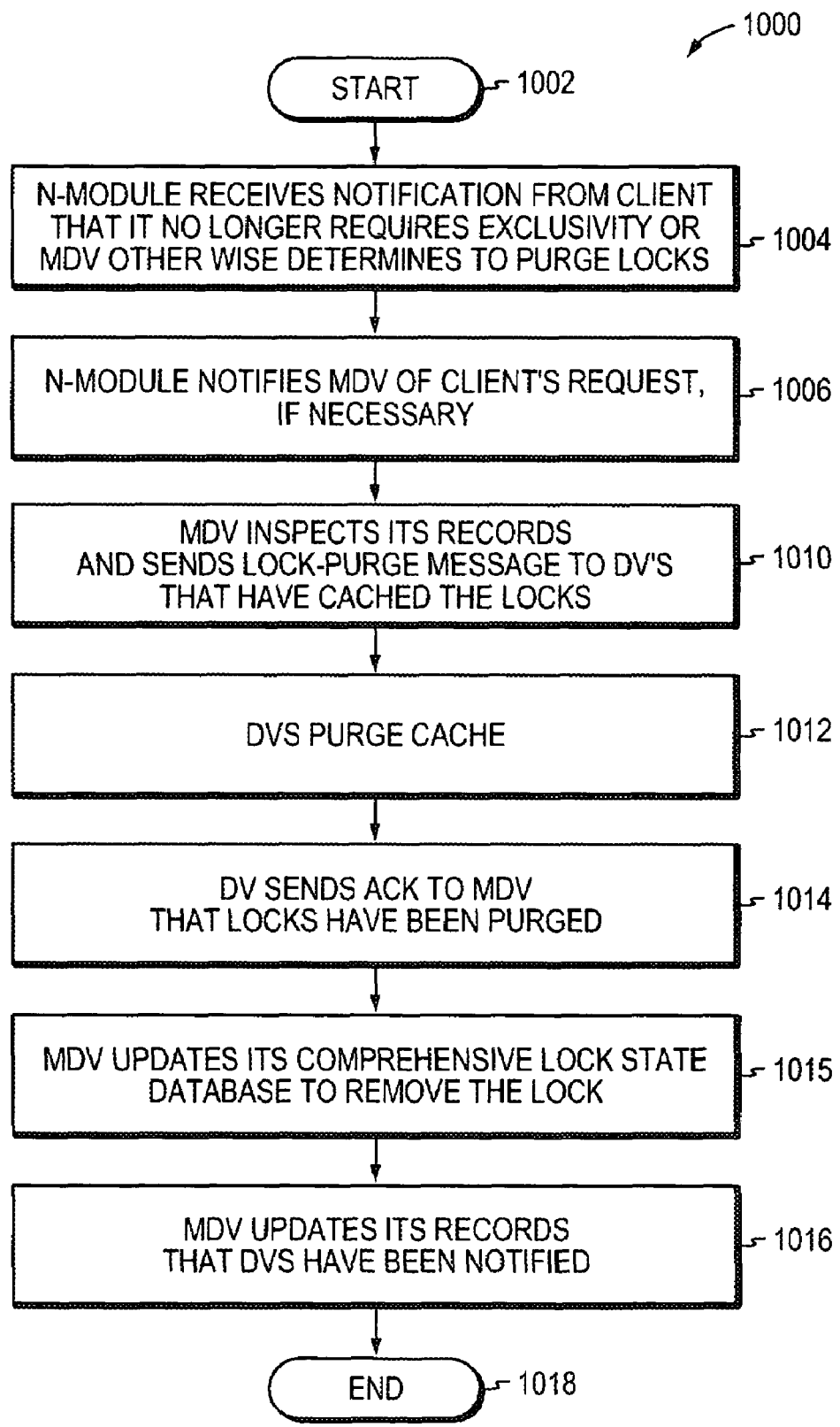
FIG. 10 is a flow chart of a procedure for purging locks in accordance with an illustrative embodiment of the invention.

During subsequent operation of the system, a particular client may determine that it no longer requires exclusivity with respect to a particular file or byte range. Thus, in accordance with the invention the procedure 1000 is followed, which is illustrated in FIG. 10. The procedure starts at step 1002 and continues to step 1004 where an N-module receives a notification from a client that it no longer requires exclusivity on a particular byte range. In step 1006, the N-module notifies the MDV node of this development. In step 1010, the MDV node thereafter checks its records to determine which DV nodes had been supplied with lock state information, and sends a lock state command, e.g., a LOCK_PURGE message, to each affected DV node to purge its local lock cache with respect to that byte range. In step 1012, the relevant DV nodes purge their lock state caches to remove the lock on that particular byte range and in step 1014, each DV node sends an acknowledgement to the MDV node that the lock has been purged. In step 1015, the MDV node updates its lock state database to remove the particular lock which had existed on that byte range. In step 1016, the MDV node updates its records that each DV node has been notified thereof and has received an acknowledgement of the removal of the locks, i.e., the lock purge. The procedure ends at step 1018. In an alternative aspect of the invention, the MDV node may itself decide to purge locks and in which case these changes are either separately sent by messages to the respective DV nodes or are broadcast-notified to all DVs that have an interest in that file or byte range. There may be other reasons for which the MDV node determines that lock state has changed and it can thereby notify DV nodes accordingly. In other instances, the DV node may determine that it is going to release cached locks from its own local lock cache under certain circumstances.

Figure 11:
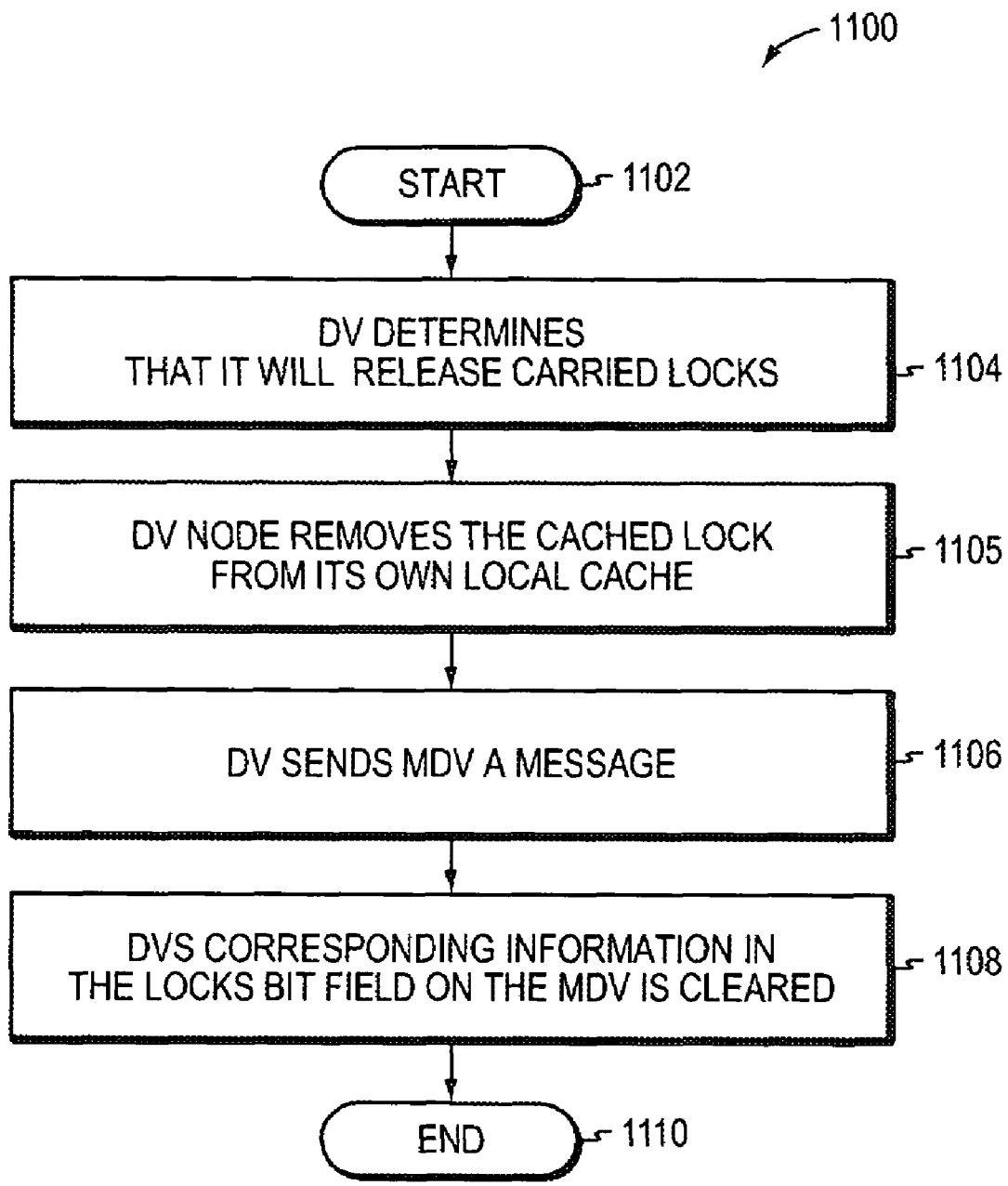
FIG. 11 is a flow chart of a procedure for discarding locks by a DV node in accordance with an illustrative embodiment of the invention.

More specifically, FIG. 11 is a flow chart of a procedure for discarding locks by a DV node in accordance with the invention. In this instance, a DV node determines that it must release cached locks particularly if, e.g., as noted the DV node is memoryconstrained and needs to free up memory space. In this case, the DV node is configured to release older locks in favor of newer ones. The procedure 1100 starts at step 1102 and proceeds to step 1104 in which a DV node determines that it will release cached locks, and thus, in accordance with step 1105, the DV node removes the corresponding lock state information from its local lock cache. In step 1106, the DV node sends a message to the MDV node. In step 1108, that DV node's corresponding information bit in the lock state validation field 714 in the respective lock state database structure 700 of the MDV node is cleared. The procedure ends at step 1110.

E. EXAMPLES

Figure 12:
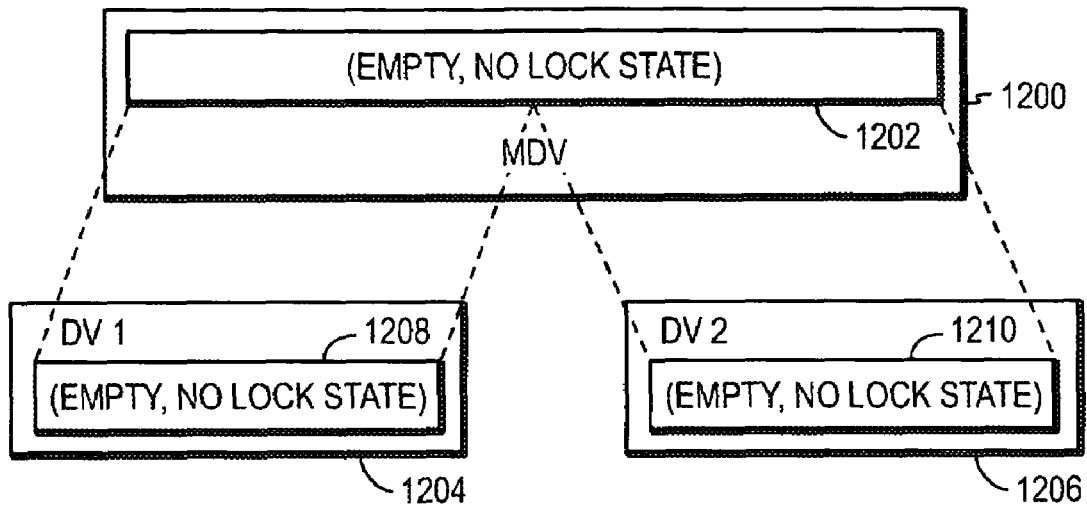
FIG. 12 is schematic block diagram of an exemplary MDV node and two DV nodes in an initial configuration in accordance with an illustrative embodiment of the present invention.

The following examples illustrate lock state interaction between DV nodes and the MDV node in accordance with the present invention. FIG. 12 illustrates an initial configuration in which MDV node 1200 has an empty lock state database 1202, indicating the absence of a lock for a file in question. DV1 node (1204) is responsible for client data access requests directed to the first half of the file and DV2 node (1206) is responsible for such access requests directed to the second half of the file. In DV1 node, the lock cache 1208 is empty and thus contains no lock state information. Similarly, lock cache 1210 of DV2 node is also empty with no lock state information contained therein.

Figure 13:
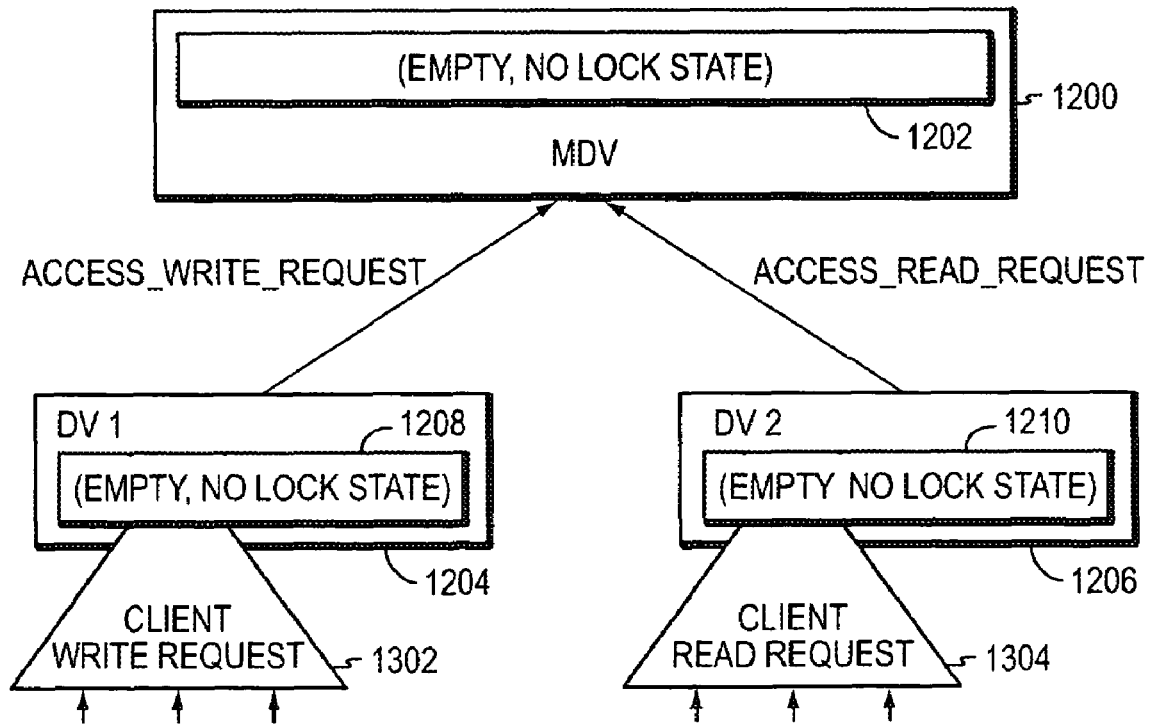
FIG. 13 is a schematic block diagram of the MDV node and DV node 1 and DV node 2, illustrating clients requesting data access operations in accordance with an illustrative embodiment of the present invention.

FIG. 13 illustrates the case in which clients attempt to access two different sections of the file. In the first instance, a client write request 1302 is received by DV1 node requesting a section of the file maintained by that node. In addition, a client read request 1304 is received by DV2 node, requesting access to a section of the file maintained by the DV2 node. Upon receiving the client write request 1302, the DV1 node consults its local lock cache 1208 and finds no information for the range of data being targeted. Thus, the DV1 node queries the MDV node by sending another lock state command, e.g., ACCESS_WRITE_REQUEST, message to the MDV node 1200 requesting lock state information for the byte range of the pending access write request. It is noted that the type of request is included in the message.

Similarly, when DV2 node receives its request, it consults its local lock cache 1210 and finds an absence of information. DV2 node thus sends an ACCESSREAD_REQUEST message regarding the received read request 1304 to the MDV node. The MDV node 1200 receives the write and read messages from the DV1 and DV2 nodes, respectively, and checks its authoritative lock state database 1202. Since no locks are present that conflict with either request, the MDV node responds that both operations can proceed.

Figure 14:
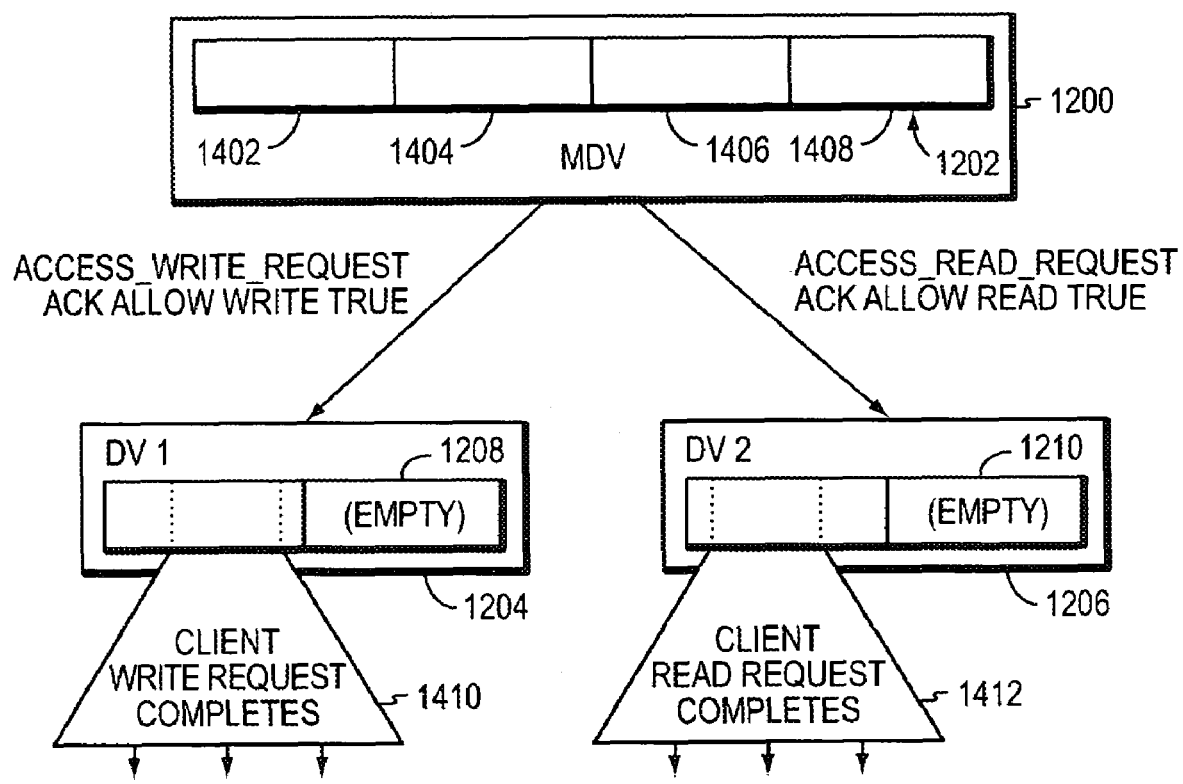
FIG. 14 is a schematic block diagram of the MDV node and DV nodes illustrating the MDV node's response to DV node requests.

FIG. 14 is a schematic block diagram illustrating the MDV node's response to the request of FIG. 13. More specifically, DV1 node 1204 has sent an access write request message to the MDV. In the example of FIG. 14, the MDV node has found that there are no locks in the range requested. Thus, the MDV node in FIG. 14 sends an access write request acknowledgement with a message allowing the write and an indication that the DV1 node has all lock state information for that file of byte range requested. Thus as illustrated in FIG. 14 the client write request completes as shown block 1410. Similarly, DV2 node has issued a read request to the MDV node and the MDV node has not found conflicting locks and thus responds to the DV2 node indicating access read request acknowledged, allowing the read and a true indication that the DV2 node has all lock state information for the byte or file in question; thereafter, the DV2 node completes the client read request, at 1412.

If possible, DV1 and DV2 nodes can update their local caches 1208 and 1210 respectively because of lock caches have memory capacity available. To the extent, they do not have such information available, the DV nodes can still complete the requests because the MDV node has provided the results of the I/O requests.

In accordance with a further illustrative aspect of the invention, a list of locking ranges per file can be maintained in the DV node's local lock cache, if there is memory capacity in the local lock cache. If so, when the lock state is first created for a file on a DV node, the entire span of the file handled by that DV node is assumed to be invalid, meaning that it is subject to a lock. The DV node adds an entry with this span to its list of invalid ranges. When an I/O operation arrives at a DV node, the DV node's lock manager examines this list of invalid ranges for the requested file. If the I/O operation overlaps with any of the invalid ranges, the operation is suspended and a request for locking information is sent to the MDV node by the DV node. This is because the DV node may not have the full set of locks for this range, and though the span includes locks, it may be that the respective individual range requested is not subject to a lock, which would mean that the I/O request may be allowable. Thus, a request is sent to the MDV node that includes information about the I/O operation that instigated the request.

Upon receiving the request from the DV node, the MDV node consults its lock state database 1202 and determines the validity of the operation included in the request, populating this result in its response to the DV node in a message such as those discussed with reference to FIGS. 12 to 14. In a further aspect of the invention, the MDV node next ensures that all shared locks (on entire files) have already been cached by the DV node for that span. If not, shared lock state is added to the response, if possible. Finally, the MDV node also scans the set of range locks for the file in question and for each lock which is not yet cached on the requesting DV node, the MDV node adds this lock to the response message. It is noted that not all shared and range locks may fit into the response and an appropriate priority packing rule can be established as desired in a particular application of the invention, as noted herein.

Figure 15:
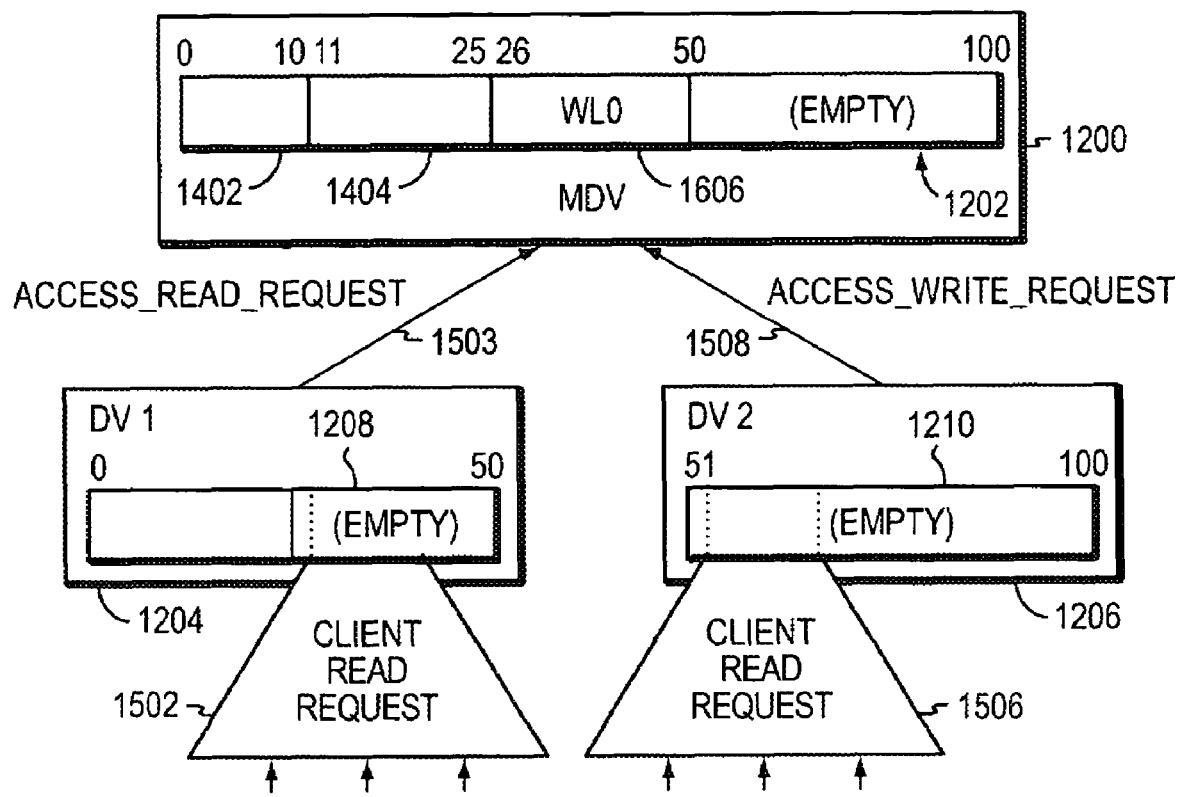
FIG. 15 is a schematic block diagram illustrating client data access requests in the presence of the write lock of FIG. 14.
Figure 16:
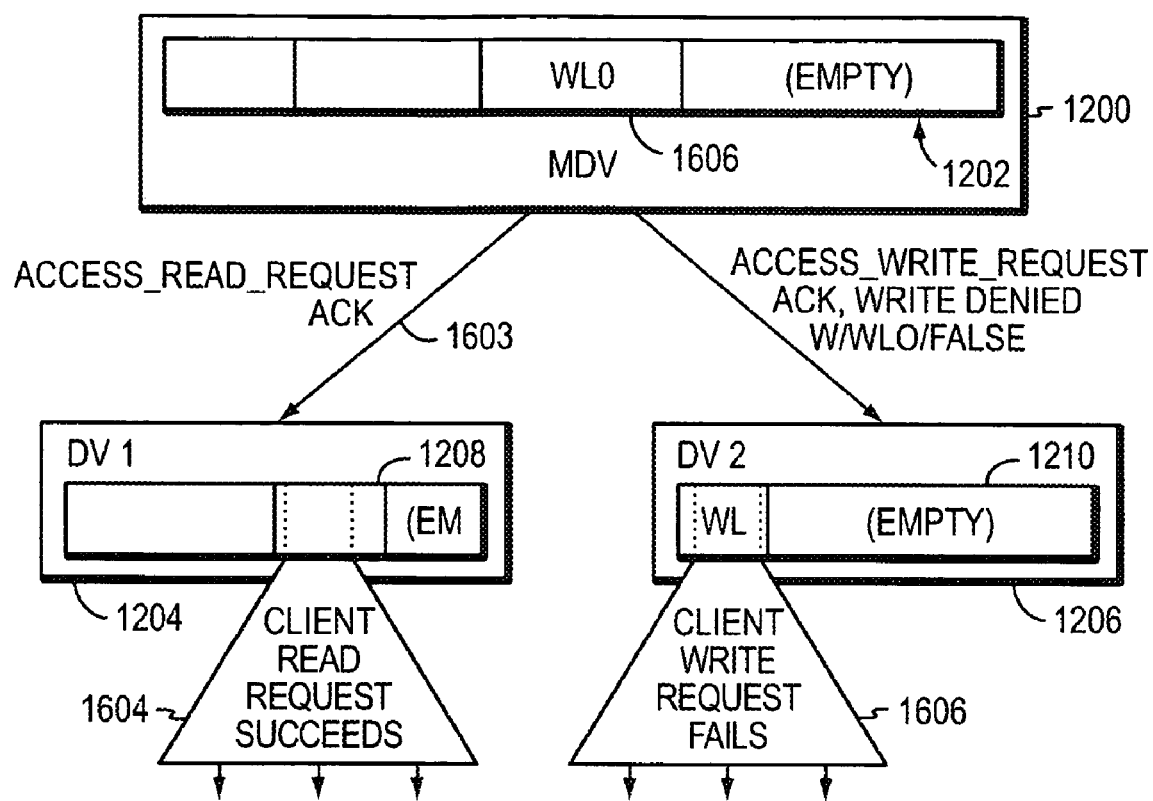
FIG. 16 is a schematic block diagram in which the MDV node responds to access requests of FIG. 15.

FIG. 15 illustrates a specific example of a client attempting to access a file which includes a write lock. For example, the write lock WL0 has been placed on byte range 26 to 50 of a file as illustrated in the MDV lock cache 1200. In the example of FIG. 15, a first client requests read access 1502 to a range that is controlled by DV1 node, which range is unoccupied in the local lock cache 1208 of DV1 node. In response to receiving the client read request, a DV1 node sends an ACCESS_READ_REQUEST message 1503 to the MDV node 1200. The MDV node 1200 checks its authoritative lock state database and determines that the area is partly occupied by the write lock WL0. However, in this case, the write lock WL0 allows a read only operation to complete as a concurrent transaction. Thus, the MDV node as illustrated in FIG. 16 responds with an access read request acknowledgement 1603 and appends the result that the read request is allowed and an indication of the write range locks on range 26 through 50 of write range WL0 (range 26 through 50 of the relevant file). Accordingly, the client read request succeeds at 1604.

Referring to FIG. 15, a second client requests write access 1506 to a byte range controlled by the DV2 node. The DV2 node thus sends an access write request message 1508 to the MDV node 1200. Yet, the second client has requested write access to a range within the file protected by the earlier implemented write range lock WL0 (1606 in FIG. 16). The MDV node checks its authoritative lock state database and determines that the byte range requested is already protected by a write range lock and therefore a second write cannot concurrently be allowed. Thus the MDV node 1200 returns an access write request acknowledgement, with an indication that the write is denied the WL0 write range lock. The MDV message, if possible, also indicates whether or not the DV2 node now has all of the lock state information for that file in question. As illustrated in FIG. 16, the client write request thus fails as shown in 1606.

Figure 17:
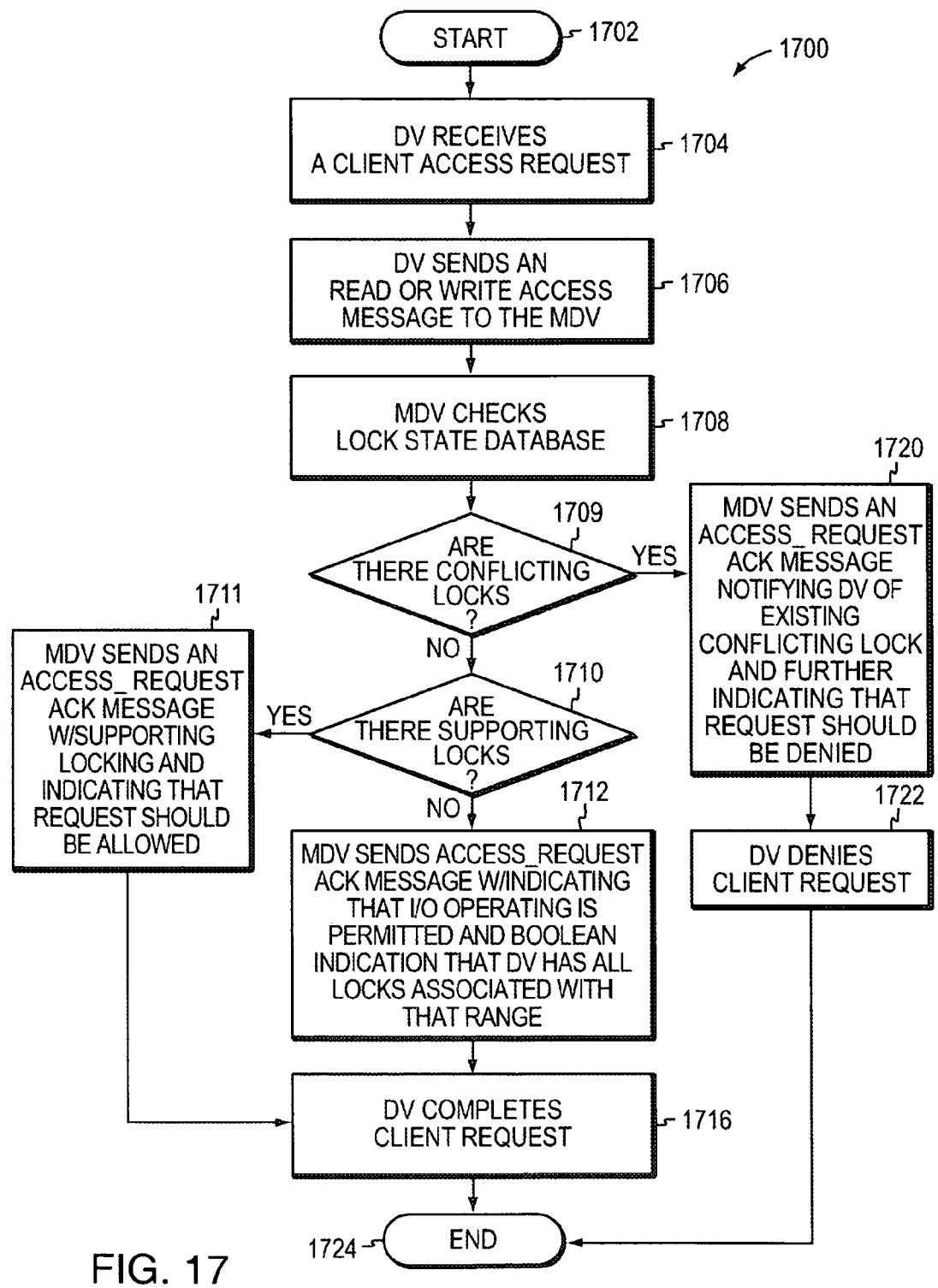
FIG. 17 is a flow chart detailing the steps of a procedure for providing lock state information in accordance with an illustrative embodiment of the present invention.

FIG. 17 is a flow chart illustrating a procedure for handling read and write requests in accordance with the present invention. The procedure 1700 starts at step 1702 and proceeds to 1704 in which a DV node receives a client access request directed to a file or a range of a file. In step 1706, the DV node sends a read or write message to the MDV node, which checks its lock state database in step 1708. In decision step 1709, the MDV node inspects its lock state information to determine whether there are conflicting locks. If a conflicting lock exists on all or a portion of the requested range, the procedure continues to step 1720 where the MDV node sends an ACCESS_REQUEST ACK message and a result which indicates that there are conflicting locks and that the request should be denied. In addition, the DV node is notified of the existing conflicting lock. In step 1722, the DV denies the client request, and the procedure ends at step 1724.

If instead, the MDV node determines that there are no conflicting locks, then the procedure continues to step 1710 in which the MDV node further checks whether there are supporting locks that allow requested operation. If there are such supporting locks, then the procedure continues to step 1711 in which the MDV node sends an ACCESS_REQUEST ACK message with supporting lock information. The DV node then completes the requested operation in step 1716, and the procedure ends at step 1724.

If there are no supporting locks, and in fact there are no locks at all, the procedure continues to step 1712 in which the MDV node sends an acknowledgement message indicating that the I/O operation is permitted and the permitting indication that the DV has all lock information associated with that file or byte range. In step 1716, the DV then completes the client request. The procedure ends at step 1724.

Figure 18A:
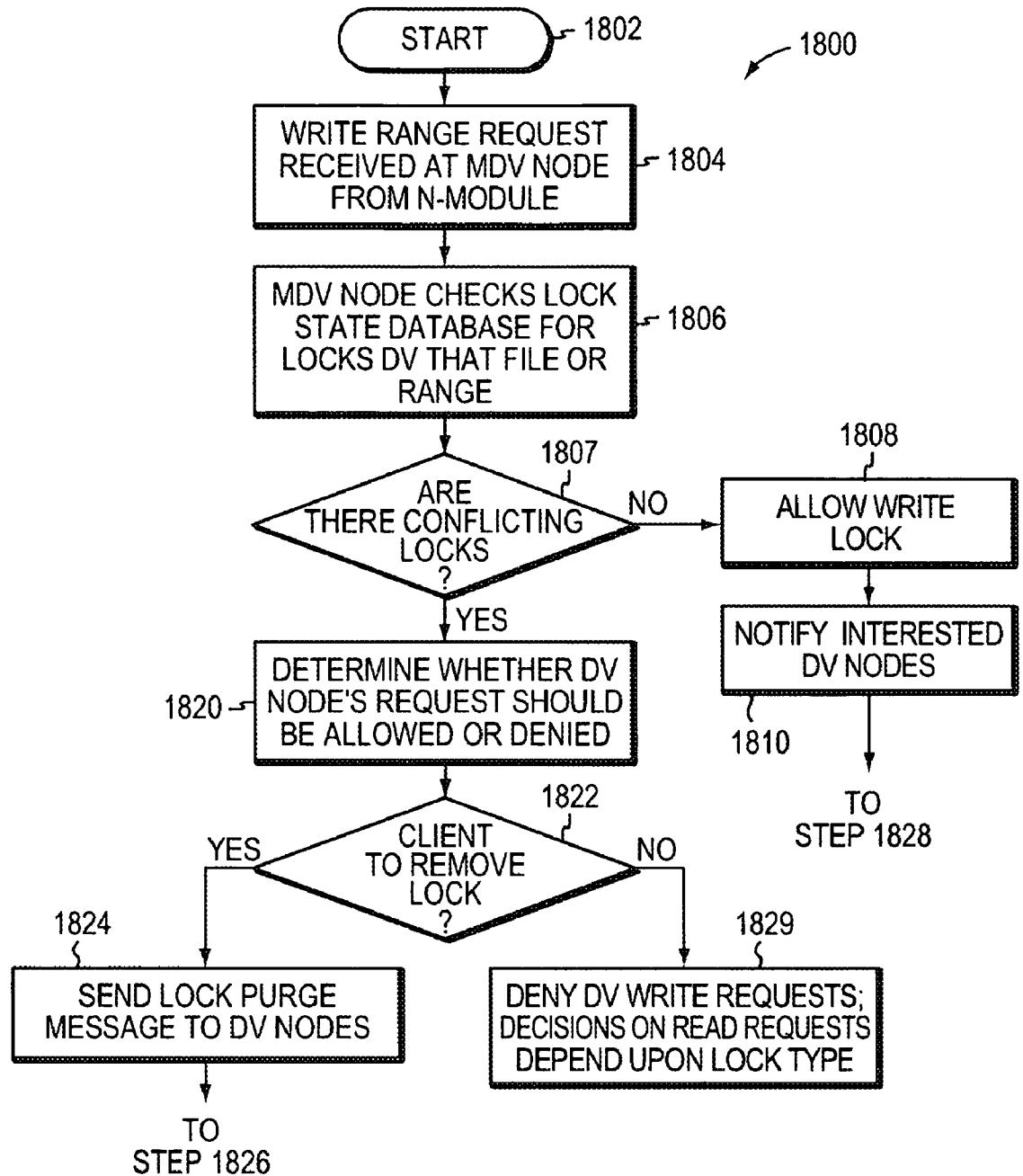
FIGS. 18A and 18 B together form a flow chart of a procedure regarding a client request at an N-module for a lock in accordance with an illustrative embodiment of the invention.
Figure 18B:
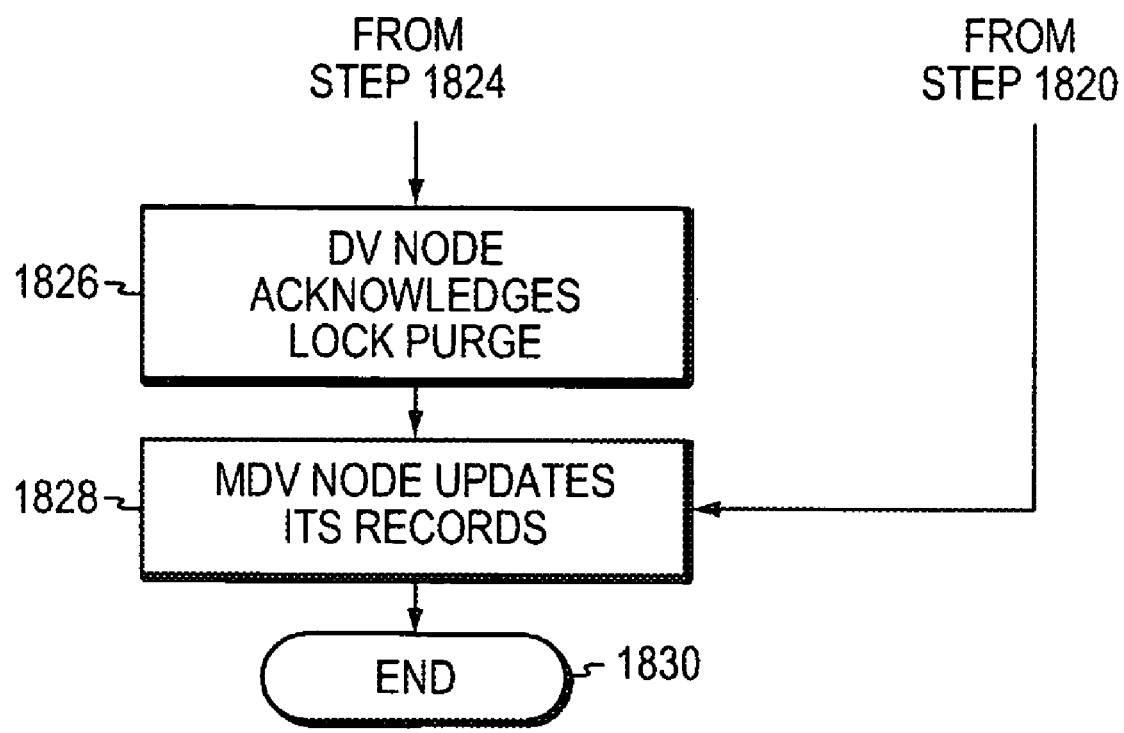

FIGS. 18A and 18B together form a flowchart illustrating a procedure for handling a case where a client directs a write lock to the MDV node at the N module, in other words, a client write range lock request for a file is directed to the MDV node by the N module, instead of from one of the DV's associated with that MDV node. The procedure begins at step 1802 and proceeds to step 1804 in which a write range request is received at the MDV node. In response to the request, the MDV node checks its lock state database for locks with respect to that file as shown in step 1806. More specifically in step 1807, the MDV node determines whether is a conflicting client requested lock. If, at the decision 1807, the MDV node finds that are no conflicting locks, then the procedure continues to step 1808 and the MDV node allows the write lock. The MDV node then notiLies DV nodes that are interested in that file of the write lock, as shown in step 1810. If there are locks, the MDV node determines whether any DV node's write or read access request is allowed for that range and informs the DV node to act accordingly, as in step 1820.

If later the client determines that the write range lock should be removed (step 1822), the MDV node can send a lock purge message designating elimination of the lock to an affected DV as shown in step 1824. When the DV acknowledges the lock purge message as shown in step 1826, the MDV can update its records that the DV node has been notified as shown in step 1828. Alternatively, as long as the client continues the lock, then DV write requests will be denied, as shown in step 1829, and read only requests will be allowed if permitted by the particular type of lock imposed by the client. The procedure ends at step 1830.

To again summarize, in accordance with the invention, novel lock state command messages are provided to convey lock state information between the MDV node and the DV nodes. For example, in response to receiving a data access request directed to a data container from a client, the DV node checks its own local lock cache to determine whether it contains relevant lock state information for the pending request. If not, the DV node sends a command/query within a lock state message to the MDV node, which responds with appropriate lock state information regarding conflicting locks, if any.

When a DV node sends a lock state message to the MDV node with a command/query, the MDV node inspects the lock state information with respect to a range (if any) requested by the DV node and determines whether there are shared locks or exclusive locks pertaining to that requested range. The MDV node then consults this relevant lock state information and determines whether the data access request is permitted, depending on the type of locks present and whether the request is a read request or a write request. For example, if the request is a write request for a range upon which there is an exclusive lock in effect, then that write request must be denied.

After determining that the DV node's request will be accepted or rejected based on its local lock state information, the MDV node constructs a response to the DV node. The response contains the specific locks pertaining to the DV node's request, along with a field which states the result, i.e., whether the input/output file operation is permitted to proceed or not. The DV node will add the lock state returned in the MDV node's response in its local lock cache, assuming it has sufficient memory space available. However, if the DV node does not have the requisite memory space available in its local lock cache, then it can still process the request or deny the request accordingly based upon the authoritative operation permission result provided to it in the MDV node's response. By providing both the relevant lock state as well as an authoritative decision about the acceptability of the requested operation, the system is able to behave properly even in cases where the DV node is unable (or unwilling) to store any more lock state in its local cache.

In addition, illustratively, the MDV node maintains a record of lock state information that it has sent to each DV node. Subsequently if a client removes a lock from a file, the MDV node examines the lock being removed and notifies each affected DV node that this lock is no longer present.

In accordance with a further illustrative aspect of the invention, when a client adds a lock to a file in a striped volume environment, the MDV node does not "push" this information automatically to the DV node. It may, however, be configured to inform interested DV nodes that their lock states for that file are now invalid for some regions. The MDV node accomplishes this by first consulting a striping table to determine the striping rules for this file. Using the striping rules and the file range of the lock being added, the MDV node determines which DV nodes are potentially impacted by the addition of this lock. For each such DV node which is listed in the files list of interested DV nodes, the MDV illustratively performs the following check: if the new lock range overlaps with any empty ranges (byte ranges with no locks present) or locks which are marked as having been cached by the DV node in question, then the MDV node sends a message to that DV node, telling it the file range covered by the lock being added is now invalid. In other words, if the range of the lock being added completely overlaps the ranges of the other locks which have not yet been cached at the DV node in question, there is no reason to inform the DV node that this lock's range is invalid.

When a client removes a lock from a file, the MDV node examines the lock being removed. Iterating over each DV node which is marked as having previously cached the lock being removed, the MDV node notifies each DV node that this lock is no longer present. The state of the recipient DV nodes invalid ranges and other cached locks is unaffected. It is noted that when the MDV node makes a locking decision on behalf of a DV node, the MDV marks the locks it examines when making that decision as being in use on that DV node, even if those locks are unable to fit in the response to the DV node. Thus, when a lock is later removed by a client as just discussed, those locks being removed, which are also marked as having been used in any decision, must be revoked at the affected DV nodes before that lock may be removed from the MDV node.

It should be understood that the CF protocol messaging for managing lock state information illustratively described herein may be written, modified or expanded upon or written in a different software language, or in a code with different semantics or of a different format while remaining within the scope of the present invention.

In sum, the present invention described herein provides an efficient and reliable technique for managing lock state information, including hard lock state information, in a distributed storage system environment without requiring specialized software on the client. The foregoing description has been directed to particular embodiments of this invention. It will be apparent however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method of managing lock state information in a system including a plurality of data volumes of a striped volume set, comprising:

connecting two or more nodes together to form a cluster, t each node in the cluster being associated with least one data volume of the plurality of data volumes and each data volume is a logical arrangement of a plurality of storage devices connected to one of the nodes;

striping one or more data containers across the plurality of volumes in the striped volume set;

configuring a meta-data volume node that includes a lock state database that stores lock state information for one or more data containers on the striped volume set; and communicating the lock state information including an input/output operation result for input/output requests from said meta-data volume node to one or more data volume nodes of the system, using lock state command messages;

in response to said meta-data volume receiving a client request to add a new lock to a file in a striped volume environment, consulting at said meta-data volume node, a striping table to determine striping rules for said file;

using striping rules from said striping table, and a file range of the new lock being added, and determining at said meta-data volume, which data volume nodes are impacted by the addition of the new lock; and for each such data volume node listed in a list of impacted data volume nodes, performing at said meta-data volume the following: if the new lock overlaps with a byte range with no locks present, or locks which are marked as having been cached by the data volume node in question, then the meta-data volume node sends a message to that data volume node, informing it of the new lock and that the file range covered by the new lock is invalid.

2. The method as defined in claim 1 further comprising establishing in each data volume node a local lock cache for storing the lock state information for the data containers served by the data volume node.

3. The method as defined in claim 2 including establishing a set of caching rules for data that is to be stored in said local lock cache depending upon the memory capacity of the local lock cache.

4. The method as defined in claim 1, further comprising:
in response to said meta-data volume node receiving a request from a client for exclusive access to a range of a data container, searching said lock state database for conflicting locks, and if no such locks are found, granting a lock with respect to said range; and constructing a lock state database structure in said lock state database, said lock state data structure adapted to send messages to a data volume node, the messages including information about the client requesting the exclusive access, a lock state access type, a lock access range and an input/output operation result.

5. The method as defined in claim 4, further comprising:
in response to a receipt from a client that it no longer requires exclusivity, updating the lock state database at the metadata volume node to remove the respective lock; and inspecting the records at the metadata volume node and sending a lock purge message to one or more data volume nodes that have cached the respective lock; and updating the records at the metadata volume node to indicate that said data volume nodes have been notified of the removal of the respective lock.

6. The method as defined in claim 5, further comprising:
in response to receipt of a lock purge message, each of said one or more data volume nodes purging cached locks as instructed and sending an acknowledgement to the metadata volume node that such locks have been purged.

7. The method as defined in claim 1, further comprising:
in response to receiving a request for a data access operation, inspecting a local lock cache of a data volume node to determine whether there is a lock that affects the requested operation; and in the absence of lock state information in the local lock cache, querying the metadata volume node regarding lock states which affect the pending access operation.

8. The method as defined in claim 7, further comprising:
in response to a query from a data volume node, inspecting the lock state database of the metadata volume node for information regarding locks that affect or support the operation; and sending a message to the data volume node notifying the data volume node of the input/output operation result and locks affecting the pending operation.

9. The method as defined in claim 8, further comprising:
updating records at the metadata volume node to indicate that the recipient data volume node has been notified of a particular lock.

10. The method as defined in claim 9, further comprising:
in response to receiving a message from the metadata volume node, acknowledging the message at the data volume node and handling the access operation according to the input/output operation result provided to it by the meta-data volume node.

11. The method as defined in claim 1 wherein said meta-data volume node is further configured to include a Boolean value indicating whether the data volume node has a complete set of lock state information regarding a file or range.

12. The method as defined in claim 1 including using said lock state command messages in a distributed storage system.

13. The method as defined in claim 1 wherein said meta-data volume node and said one or more data volumes nodes are configured in a distributed storage system.

14. A method of managing lock state information in a system including a plurality of data volumes of a striped volume set, comprising:
configuring a meta-data volume node that includes a lock state database that stores lock state information for one or more data containers on the striped volume set;

communicating the lock state information including an input/output operation result for input/output requests from said meta-data volume node to one or more data volume nodes of the system, using lock state command messages;

in response to said meta-data volume node receiving a request from a client for exclusive access to a range of a data container, searching said lock state database for conflicting locks, and if no such locks are found, granting a lock with respect to said range;

constructing a lock state database structure in said lock state database, said lock state data structure adapted to send messages to a data volume node, the messages including information about the client requesting the exclusive access, a lock state access type, a lock access range and an input/output operation result;

in response to said meta-data volume receiving a client request to add a new lock to a file in a striped volume environment, consulting at said meta-data volume node, a striping table to determine striping rules for said file;

using striping rules from said striping table, and a file range of the new lock being added, and determining at said meta-data volume, which data volume nodes are impacted by the addition of the new lock; and for each such data volume node listed in a list of impacted data volume nodes, performing at said meta-data volume the following: if the new lock overlaps with a byte range with no locks present, or locks which are marked as having been cached by the data volume node in question, then the meta-data volume node sends a message to that data volume node, informing it of the new lock and that the file range covered by the new lock is invalid.

15. A system configured to manage lock state information in a system, the system comprising:
two or more nodes connected together to form a cluster, each node in the cluster being associated with at least one data volume of a plurality of data volumes and each data volume is a logical arrangement of a plurality of storage devices connected to the node;

one or more data containers striped across the plurality of volumes in a striped volume set;

a plurality of data volume nodes adapted to receive data access requests from a client directed to a data container or range of the data container; and a meta-data volume node configured to communicate with said data volume nodes and configured to include a lock state database that stores lock state information for the data container, and to provide input/output operation results to data access requests received from a client at said data volume node; a striping table to determine striping rules for files, said meta-data volume being configured to consult said striping table to determine striping rules for said file; said meta-data volume being further configured to use striping rules from said striping table, and a file range of a new lock being added, to determine at said meta-data volume, which data volume nodes are impacted by the addition of the new lock;

said meta-data volume being further configured to receive a message from a data volume regarding client requests for I/O operations, and the meta-data volume checks the lock state database for conflicting locks, and in response to said meta-data volume node finding that there are conflicting locks, then the meta-data volume nodes sends an acknowledgement to the data volume notifying the data volume of the existing conflicting lock and further indicating that the request should be denied;

said meta-data volume node being further configured such that, if there are supporting locks then the meta-date volume sends an access request with supporting lock information and indicating that the request should be allowed;

said meta-data volume node further configured to send an access request acknowledgment message indicating that I/O operation is permitted and a Boolean indication that the data volume issuing the request has all the locks associated with that range after which the data volume node completes the client request.

16. The system as defined in claim 15 further comprising:
at each said data volume node, a local lock cache, the local lock cache for storing lock state information.

17. The system as defined in claim 15, further comprising a storage server including a lock manager for managing lock state information and messaging between said metadata volume node, and one or more data volume nodes.

18. The system as defined in claim 15 wherein said plurality of data volume nodes and said meta-data volume node are configured in a distributed storage system.

19. The system as defined in claim 15 wherein said lock state information relates to a distributed storage system.

20. A computer readable storage medium containing executable program instructions executed by a processor, comprising:
program instructions that connect two or more nodes together to form a cluster, each node in the cluster being associated with at least one data volume of a plurality of data volumes and each data volume is a logical arrangement of a plurality of storage devices connected to the node storing each data volume;

program instructions that stripe one or more data containers across the plurality of volumes in the striped volume set in accordance with a striping table containing striping rules;

program instructions that configure a meta-data volume node that includes a lock state database that stores comprehensive lock state information for one or more data containers stored on the system;

program instructions that communicate lock state information and input/output operation results between said meta-data volume node and one or more data volume nodes of said system, using lock state command messages, said instructions including the meta-data volume node receiving a message from a data volume node regarding client requests for I/O operations, program instructions that further configure said meta-data volume that in response to receiving a client request for a file in a striped environment, to consult a-at said meta-data volume node, a striping table to determine striping rules for files; using said striping rules from said striping table, and a file range of a new lock being added, and determining at said meta-data volume, which data volume nodes are impacted by the addition of the new lock;

program instructions that further provide that the meta-data volume checks the lock state database for conflicting locks, and in response to said meta-data volume node finding that there are conflicting locks, then the meta-data volume node sends an acknowledgement to the impacted data volume node notifying it of the existing conflicting locks, and further indicating that the request should be denied;

program instructions that said meta-data volume node further checks the lock state database for supporting locks and if there are supporting locks then the meta-data volume node sends an access request to the impacted data volume node with supporting lock information and indicates that the request should be allowed; and said meta-data volume node further sends an access request acknowledgment message indicating that I/O operation is permitted and a Boolean indication that the impacted data volume issuing the request has the locks associated with that range after which the data volume node completes the client request.

21. The computer readable storage medium as defined in claim 20 further comprising:
program instructions that establish in each said data volume node, a local lock cache for storing lock state information about data containers served by that data volume node.

22. The computer readable storage medium as defined in claim 20 further comprising:
program instructions that establish a set of caching rules for data that is to be stored in said local lock cache depending upon the memory capacity of the local lock cache.

23. The computer readable storage medium as defined in claim 20 further comprising:
in response to said meta-data volume node receiving a request from a client for exclusive access to a data container or a range of a data container, program instructions that search, by said metadata volume node, its lock state database for conflicting locks, and if no such locks are found, granting the lock with respect to said range; and program instructions that construct in said lock state database, a lock state data structure for sending messages to an impacted data volume node including information about one or more of the client requesting the lock, a lock state access type, a lock access range, and an input/output operation result.

24. The computer readable storage medium as defined in claim 23 wherein said meta-data volume node further provides a Boolean value indicating whether said impacted data volume node has a substantially complete set of lock state information concerning a file or range.

* * * * *

UNITED STATES PATENT AND TRADEMARK OFFICE
CERTIFICATE OF CORRECTION

PATENT NO. : 7,730,258 B1
APPLICATION NO. : 11/591738
DATED : June 1, 2010
INVENTOR(S) : Toby Smith It is certified that error appears in the above-identified patent and that said Letters Patent is hereby corrected as shown below:

Col. 2, Line 28, please amend as shown:

lem is to distribute the volumes serviced by the particular [[to]]

Col. 2, Line 37, please amend as shown:

attempting to service the requests directed to that[[,]] data con-

Col. 3, Line 5, please amend as shown:

file, or [[to]] portion thereof are referred to herein as a "lock

Col. 3, Line 47, please amend as shown:

capable of returning a response to the MDV node, which [[to]]

Col. 4, Line 23, please amend as shown:

efficiently manage [[to]] the lock state information, including

Col. 6, Line 52, please amend as shown:

[[to]] FIG. 1 is a schematic block diagram of a plurality of

Col. 8, Line 24, please amend as shown:

[[disframes]] <u>discrete frames</u> or packets of data according to pre-defined proto- Col. 9, Line 43, please amend as shown:

specific and [[iSCSIspecific]] <u>iSCSI specific</u> access control to the blocks and, Signed and Sealed this Thirteenth Day of July, 2010

David J. Kappos
*Director of the United States Patent and Trademark Office*

Col. 9, Line 59, please amend as shown:

described further herein, the VSM cooperates with the [[to]] file

Col. 10, Line 28, please amend as shown:

handle, i.e., an identifier that includes an [[Mode]] <u>inode</u> number is

Col. 11, Line 51, please amend as shown:

This type of hardware implementation increases [[to]] the per-

Col. 16, Line 46, please amend as shown:

its [[to]] lock state database 603. Subsequently, when a data

Col. 17, Line 67, please amend as shown:

is [[memoryconstrained]] <u>memory-constrained</u> and needs to free up memory space. In Col. 20, Line 54, please amend as shown:

MDV node then [[notiLies]] <u>notifies</u> DV nodes that are interested in that

Col. 21, Line 15, please amend as shown:

node with a [[cornmand/query]] <u>command/query</u>, the MDV node inspects the lock Col. 22, Line 53, please amend as shown:

connecting two or more nodes together to form a cluster [[t]]